United States Patent [19]
Jain et al.

[11] Patent Number: 5,745,126
[45] Date of Patent: *Apr. 28, 1998

[54] MACHINE SYNTHESIS OF A VIRTUAL VIDEO CAMERA/IMAGE OF A SCENE FROM MULTIPLE VIDEO CAMERAS/ IMAGES OF THE SCENE IN ACCORDANCE WITH A PARTICULAR PERSPECTIVE ON THE SCENE, AN OBJECT IN THE SCENE, OR AN EVENT IN THE SCENE

[75] Inventors: Ramesh Jain; Saied Moezzi, both of San Diego; Arun Katkere, La Jolla, all of Calif.

[73] Assignee: The Regents of the University of California, Alameda, Calif.

[ * ] Notice: The term of this patent shall not extend beyond the expiration date of Pat. No. 5,729,471.

[21] Appl. No.: 667,372

[22] Filed: Jun. 21, 1996

Related U.S. Application Data

[62] Division of Ser. No. 414,437, Mar. 31, 1995, Pat. No. 5,729,471.

[51] Int. Cl.$^6$ .................................................... G06T 13/00
[52] U.S. Cl. ............................ 345/952; 348/42; 348/47
[58] Field of Search .................................... 364/514 A, 410; 395/125, 129, 119, 952; 348/13, 19, 20, 39, 42, 47; 273/433

Primary Examiner—James R. Trammell
Assistant Examiner—Thomas Peeso
Attorney, Agent, or Firm—Fuess & Davidenas

[57] ABSTRACT

Each and any viewer of a video or a television scene is his or her own proactive editor of the scene, having the ability to interactively dictate and select—in advance of the unfolding of the scene and by high-level command—a particular perspective by which the scene will be depicted, as and when the scene unfolds. Video images of the scene are selected, or even synthesized, in response to a viewer-selected (i) spatial perspective on the scene, (ii) static or dynamic object appearing in the scene, or (iii) event depicted in the scene. Multiple video cameras, each at a different spatial location, produce multiple two-dimensional video images of the real-world scene, each at a different spatial perspective. Objects of interest in the scene are identified and classified by computer in these two-dimensional images. The two-dimensional images of the scene, and accompanying information, are then combined in the computer into a three-dimensional video database, or model, of the scene. The computer also receives a user/viewer-specified criterion relative to which criterion the user/viewer wishes to view the scene. From the (i) model and (ii) the criterion, the computer produces a particular two-dimensional image of the scene that is in "best" accordance with the user/viewer-specified criterion. This particular two-dimensional image of the scene is then displayed on a video display.

28 Claims, 17 Drawing Sheets

— WHO IS THIS PLAYER? ⟶ HE IS J. WASHINGTON
— WHERE IS J. WASHINGTON? ⟶ J. WASHINGTON IS HERE.

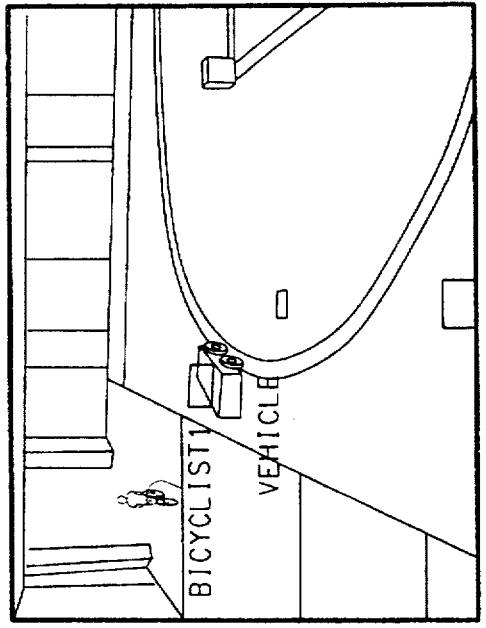
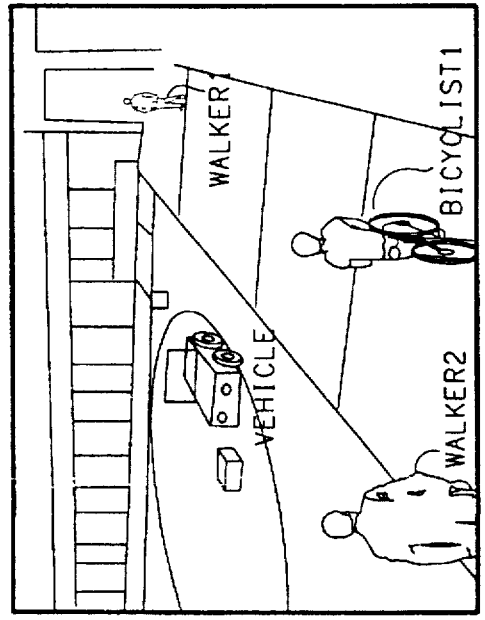
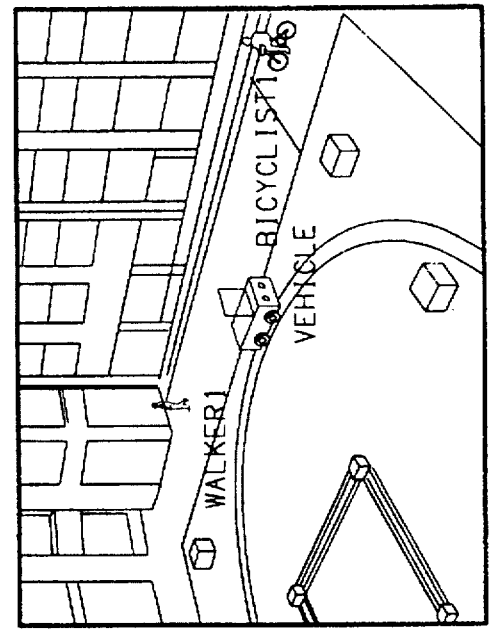
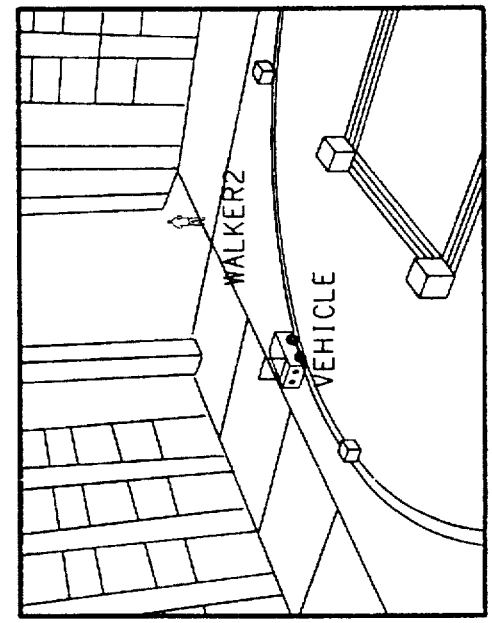
FIG. 17a CAMERA 1 VIDEO FRAME 00:21:31:24
FIG. 17b CAMERA 2 VIDEO FRAME 00:21:29:15
FIG. 17c CAMERA 3 VIDEO FRAME 00:22:29:06
FIG. 17d CAMERA 4 VIDEO FRAME 00:20:09:18

FIG. 19a
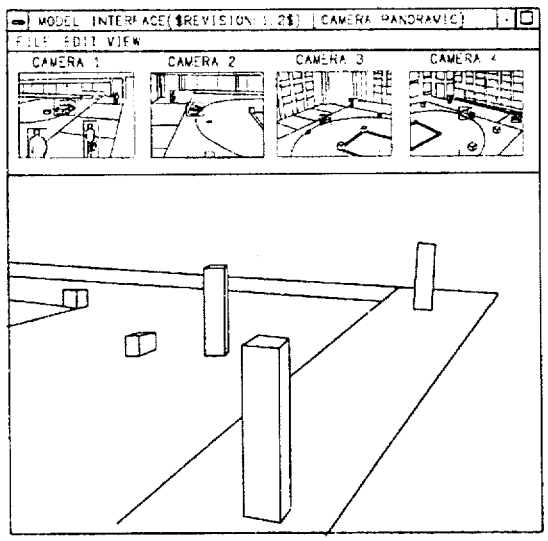
FIG. 19b
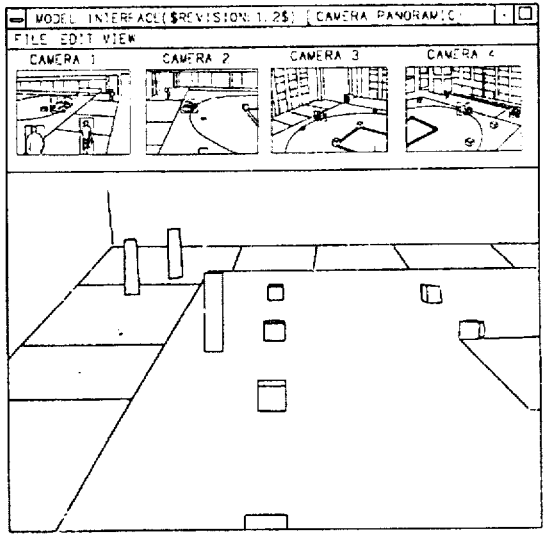
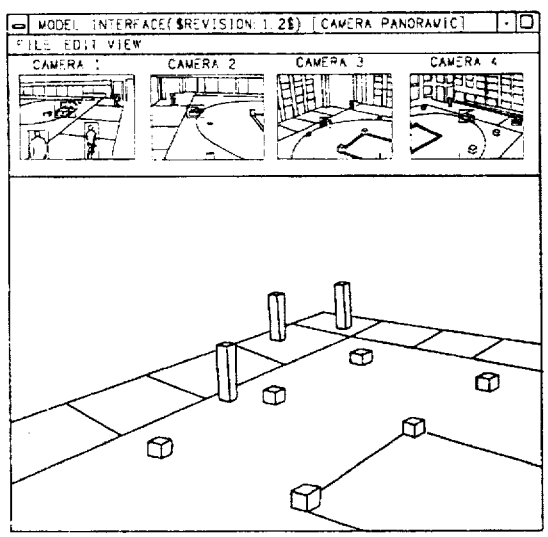
FIG. 19c
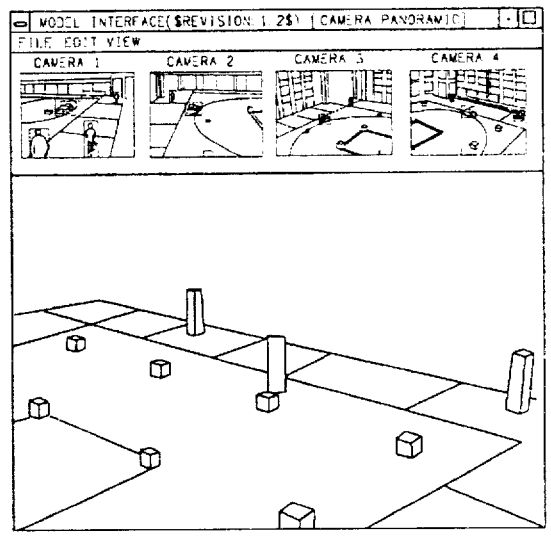
FIG. 19d
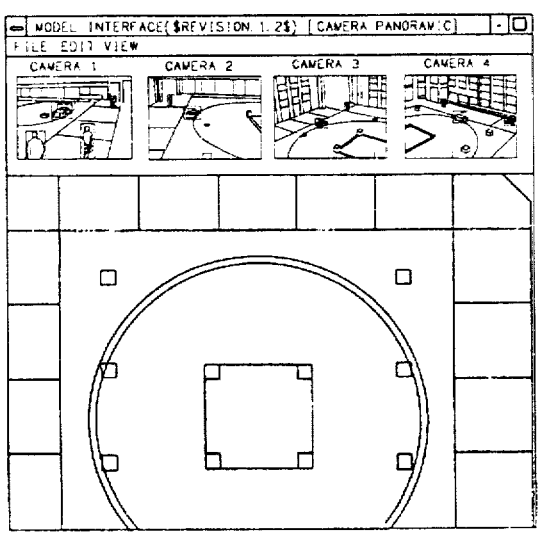
FIG. 19e

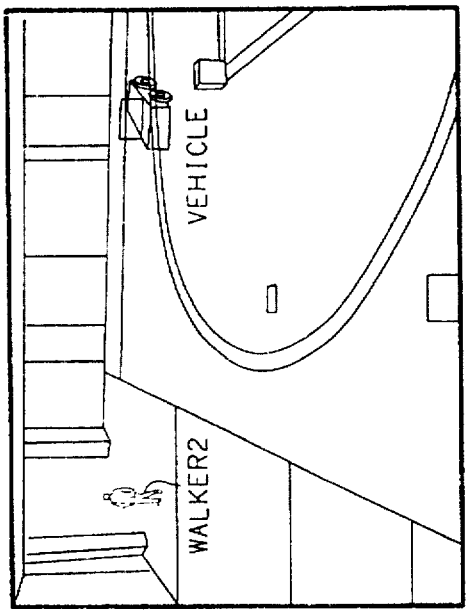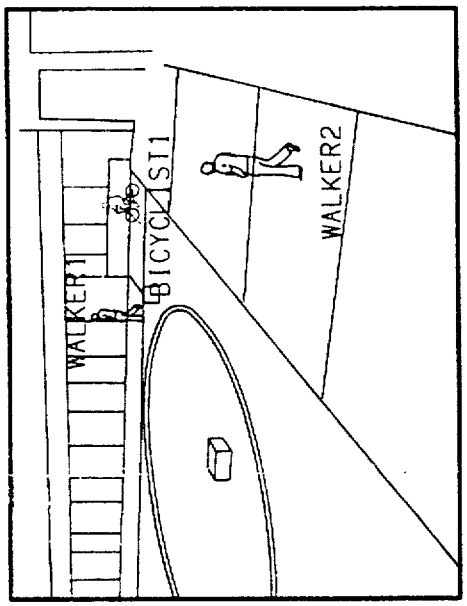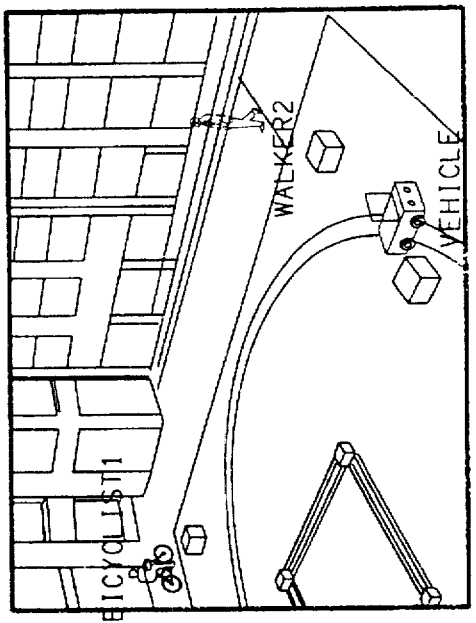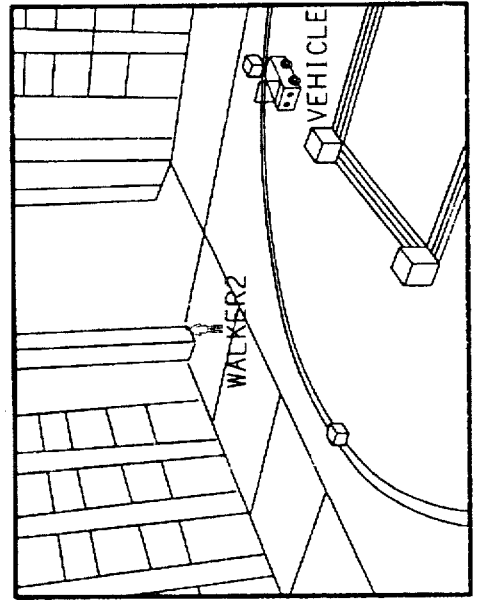
FIG. 20a CAMERA 1 VIDEO FRAME 00:21:41:24
FIG. 20b CAMERA 2 VIDEO FRAME 00:21:39:15
FIG. 20c CAMERA 3 VIDEO FRAME 00:22:39:06
FIG. 20d CAMERA 4 VIDEO FRAME 00:20:19:18

MACHINE SYNTHESIS OF A VIRTUAL VIDEO CAMERA/IMAGE OF A SCENE FROM MULTIPLE VIDEO CAMERAS/ IMAGES OF THE SCENE IN ACCORDANCE WITH A PARTICULAR PERSPECTIVE ON THE SCENE, AN OBJECT IN THE SCENE, OR AN EVENT IN THE SCENE

This application is a divisional of Ser. No. 08/414,437 filed on Mar. 31, 1995, now U.S. Pat. No. 5,729,471.

BACKGROUND OF THE INVENTION

1. Field of the Invention

The present invention generally concerns (i) multimedia, (ii) video, including video-on-demand and interactive video, and (iii) television, including television-on-demand and interactive television.

The present invention particularly concerns automated dynamic selection of one video camera/image from multiple real video cameras/images in accordance with a particular perspective, an object in the scene, or an event in the video scene.

The present invention further concerns synthesizing a virtual video camera, and a virtual video image, from multiple real video images obtained by multiple real video cameras. The present invention still further concerns the creation of three-dimensional video image databases, and the location and dynamical tracking of video images of selected objects depicted in the databases for, among other purposes, a selection of a real camera or image, or a synthesis of a virtual camera or image, to best show the object selected.

The present invention still further concerns (i) interactive synthesis of video, or television, images on demand, (ii) the synthesis of virtual video images in real time, or virtual television, and/or (iii) the synthesis of virtual video images/ virtual television pictures that are linked to any of a particular perspective on the video/television scene, an object in the video/television scene, or an event in the video/ television scene.

2. Description of the Prior Art

2.1 Limitations in the Present Viewing of Video and Television

The traditional model of television and video is based on a single video stream transmitted to a passive viewer. A viewer has the option to watch the particular video stream, and to re-watch should the video be recorded, but little else. Due to the emergence of the information highways and other related information infrastructure circa 1995, there has been considerable interest in concepts like video-on-demand, interactive movies, interactive TV, and virtual presence. Some of these concepts are exciting, and suggest many dramatic changes in society due to the continuing dawning of the information age.

It will shortly be seen that this specification teaches that a novel form of video, and television, is possible—and has, indeed, already been reduced to operative practice in rudimentary form as of the time of filing—where a viewer of video, or television, depicting a real-world scene may select a particular perspective from which perspective the scene will henceforth be presented. The viewer may alternatively select a particular object—which may be a dynamically moving object—or even an event in the real world scene that is of particular interest. As the scene develops its presentation to the viewer will prominently feature the selected object or the selected event (if occurring).

Accordingly, video presentation of a real-world scene in accordance with the present invention will be seen to be interactive with both (i) a viewer of the scene and, in the case of a selected dynamically moving object, or an event, in the scene, (ii) the scene itself. True interactive video or television is thus presented to a viewer.

In an extension of the present invention the image presented to the viewer will be seen to be a virtual image that is not mandated to correspond to any real camera nor to any real camera image. A viewer may thus view a video or television of a real-world scene from a vantage point (i.e., a perspective on the video scene), and/or dynamically in response to objects moving in the scene and/or events transpiring in the scene, in manner that is not possible in reality. The viewer may, for example, view the scene from a point in the air above the scene, or from the vantage point of an object in the scene, where no real camera exists or even, in some cases, can exist.

The video system, and approach, described in this specification will be seen to be called Multiple Perspective Interactive ("MPI") video. MPI video will overcome several limitations of the conventional video. See, for example, 1) Wendy E. Mackay and Glorianna Davenport; "Virtual video editing in interactive multimedia applications" appearing in *Communications of the ACM*, 32 (7): 802–810, July 1989; 2) Eitetsu Oomoto and Katsumi Tanaka; "Ovid: Design and implementation of a video-object database system" submitted in Spring 1995 to *IEEE Transactions on Knowledge and Data Engineering*; 3) Glorianna Davenport, Thomas Aguirre Smith, and Natalio Pincever; "Cinematic primitives for multimedia" appearing in *IEEE Computer Graphics & Applications*, pages 67–74, July 1991; and 4) Anderson H. Gary; *Video Editing and Post Production: A Professional Guide*, Knowledge Industry Publications, 1988.

MPI video will also be seen to support the editing of, and viewer interaction with, video and television in a manner that is useful in viewing activities ranging from education to entertainment. In particular, in conventional video, viewers are substantially passive; all they can do is to control the flow of video by pressing buttons such as play, pause, fast forward or fast reverse. These controls essentially provide the viewer only one choice for a particular segment of video: the viewer can either see the video (albeit at a controllable rate), or skip it.

In the case of live television broadcast, viewers have essentially no control at all. A viewer must either see exactly what a broadcaster chooses to show, or else change away from that broadcaster and station. Even in sports and other broadcast events where multiple cameras are used, a viewer has no choice except the obvious one of either viewing the image presented or else using a remote control so as to "surf" multiple channels.

With the availability of increased video bandwidth due to new satellite and fiber optic video links, and with advances in several areas of video technology, it is the opinion of the inventors that the time has come to address certain issues involved in providing truly interactive video and television systems. Incidentally, author George Gilder argues that because the viewers really have no choice in the current form of television, it is destined to be replaced by a more viewer-driven system or device. See George Gilder; *Life After Television: The coming transformation of Media and American Life*, W. W. Norton & Co., 1994.

The MPI video of the present invention will be seen to make considerable progress—even by use of currently existing technology—towards "liberating" video and TV from the traditional single-source, broadcast, model, and towards placing each viewer in his or her own "director's seat".

A three-dimensional video model, or database, used in MPI video, and certain functions performed by MPI video, prospectively serve to make MPI video a revolutionary new media. This three-dimensional model, and the functions that it performs, are well and completely understood, and are completely taught within this specification. Alas, the video bandwidth required for each viewer, and the amount of computational power required if a full custom virtual video image for each viewer is to be synthesized in real time and on demand, are both daunting and expensive (but realizable) requirements in terms of the communications and computer hardware available circa 1995. About $10^3$ more video data than is within a modern television channel may usefully be transmitted to each viewer. Each viewer may usefully benefit from the computational power equivalent to several powerful engineering workstation computers (circa 1995). Once this is done, however and in accordance with the teaching of the present invention and present specification, the "bounds of earth" are shed, and a viewer may interact with any three-dimensional real-world scene much as if he/she were an omnipotent, prescient, being whose vantage point on the scene is unfettered save only that it must be through a two-dimensional video "window" of the viewer's choice.

Rudimentary embodiments of the present invention not capable of full synthesis of virtual video—which embodiments use less, and less expensive, communications and computer hardware resource—will still be seen to do many useful things. For example, even the rudimentary, first, embodiment of the present invention that is particularly taught within the present specification—which embodiment is already functionally operative—will be seen to do many useful and novel things in, by example, the particular context of the video (and television) presentation of American football (in which environment the model is exercised). For example, some particular few football players, and the football itself, will be seen to be susceptible of being automatically "tracked" during play by the MPI video system in order that a video image presented to a viewer by the system may be selectively "keyed" to the action of the game.

According to all the preceding introduction to the context of the present invention, the pertinent background to the present invention includes a knowledge of, and sensitivity to, the present state of the computer and communications sciences. A practitioner of the multi-media arts reading the present specification is expected to be knowledgeable, and realistic, about both (i) the very considerable computer system resources that are needed, at least in 1995, in order to exercise the MPI video model of the present invention (i) in real time, and/or (ii) at maximum unfettered versatility to each and every viewer, as well as (iii) the historically-demonstrated rapidity in the improvement of these resources.

The present invention, and the present specification, will be seen to "lay out" the method, and system, of MPI video in a hierarchy of compatible embodiments leading all the way to the ultimate implementation of (i) full-customized, virtual (if desired), video and, in real time, (ii) television, images for (iii) each and every viewer of a three-dimensional, real-world, scene (as is simultaneously imaged by multiple video cameras). Progress already achieved towards this ultimate goal will be seen be, it is respectfully suggested, to be more substantial, more cost effective, and more immediately useful than might have been expected. However, progress in implementing MPI video beyond the rudimentary system of the present invention is transpiring even as of the date of filing, and still further progress is imminent. However, MPI video will not likely span the gap all the way from the rudimentary, first, system taught within the present specification all the way to its ultimate embodiment in a single step. Nor need it do so. As the system and method becomes better understood, it will be seen that both offer a logical, and orderly, progression of useful, and interesting, capabilities. To the video and television viewing public this is what is called "progress".

To continue with the football scenario, a logical "next step" in deployment of the MPI video of the present invention beyond its rudimentary implementation as is taught within this specification is as non-real-time pre-processed "game video". Such a "game video, would likely be recorded on the now-emerging new-form CD-ROM, where, for example, twenty-three different "tracks" would be recorded to profile each player on the field from both teams, and also the football. A "next step" beyond even this will be to send the same information on twenty-three channels live, and in real time, on game day. Subscriber/viewer voting may permit a limited interaction. For example, the "fans" around a particular television might select a camera, or synthesis of a virtual camera, profiting the "defensive backs". Finally, and what will undoubtedly transpire only after the lapse of some years from the present time (1995), it should be possible for each fan to be his or her own "game director", and to watch in real time substantially exactly what he or she wants.

Accordingly, to exercise the MPI video system of the present invention at its maximum capability, some advancement of technology will be useful, and is confidently expected, in the fields of computer vision, multimedia database and human interface.

See, for example, Swanberg: 1) Deborah Swanberg, Terry Weymouth, and Ramesh Jain; "Domain information model: an extended data model for insertions and query" appearing in *Proceedings of the Multimedia Information Systems*, pages 39–51, Intelligent Information Systems Laboratory, Arizona State University, Feb. 1=92; and 2) Deborah Swanberg, Chiao-Fe Shu, and Ramesh Jain; "Architecture of a multimedia information system for content-based retrieval" appearing in *Audio Video Workshop*, San Diego, Calif., November 1992.

See, for example, Hampapur: 1) Arun Hampapur, Ramesh Jain, and Terry Weymouth; "Digital video segmentation" appearing in *Proceedings of the ACM conference on MultiMedia*, Association of Computing Machinery, October 1994; and 2) Arun Hampapur, Ramesh Jain, and Terry Weymouth; "Digital video indexing in multimedia systems" appearing in *Proceedings of the Workshop on Indexing and Reuse in Multimedia Systems*, American Association of Artificial Intelligence, August 1994.

See, for example, Zhang: 1) H. J. Zhang, A. Kankanhalli, and S. W. Smoliar; "Automatic partitioning of video" appearing in *Multimedia Systems*, 1 (1): 10–28, 1993; and 2) Hong Jiang Zhang, Yihong Gong, Stephen W. Smoliar, and Shuang Yeo Tan; "Automatic parsing of news video" appearing in *Proceedings of the IEEE Conference on Multimedia Computing Systems*, May 1994.

See also, for example, 1) Akio Nagasaka and Yuzuru Tanaka; "Automatic video indexing and full-video search for object appearances" appearing in *2nd Working Conference on Visual Database Systems*, pages 119–133, Budapest, Hungary, October 1991. IFIP WG 2.6; 2) Farshid Arman, Arding Hsu, and Ming-Yee Chiu; "Image processing on compressed data for large video databases" appearing in *Proceedings of the ACM MultiMedia*, pages 267–272, California, USA, June 1993, Association of Computing Machinery; 3) Glorianna Davenport, Thomas Aguirre Smith, and Natalio Pincever; op cit; 4) Eitetsu Oomoto and Katsumi Tanaka, op cit.; and 5) Akihito Akutsu, Yoshinobu Tonomura, Hideo Hashimoto, and Yuji Ohba; "Video indexing using motion vectors" appearing in *Proceedings of SPIE: Visual Communications and Image Processing 92*, Nov. 1992.

When considering these references, it should be recalled that MPI video is already operative, as will be explained and shown, right now, and as of the time of filing. Actual results obtained on the MPI video system will be presented in this specification. The above-stated references to certain breaking, state-of-the art, developments are deemed appropriate for inclusion within the instant Background of the Invention section of this specification simply because it should be understood that the present invention has a particularly great, and likely chronologically very long, "spin-out". Nonetheless that immediately useful, and arguably practical and cost effective, results are obtainable directly from the MPI video system presented within this specification, the software programming in implementation of the MPI video system that already exists could profit from (i) a fiber optic interconnect to, and (ii) a computer of the order of an engineering workstation on the top of (or inside), every television in America. Accordingly, and while the present embodiment of the invention should be duly regarded, it will be particularly important in considering the present specification to note and understand how the MPI video method and system of the present invention is greatly expandable and extendable in each of (i) the sophistication of system functions performed, (ii) the speed of system performance, and (iii) the breadth of system deployment.

2.2 Specific Prior Art Concerning Video and Television

U.S. Pat. No. 5,109,425 to Lawton for a METHOD AND APPARATUS FOR PREDICTING THE DIRECTION OF MOVEMENT IN MACHINE VISION concerns the detection of motion in and by a computer-simulated cortical network, particularly for the motion of a mobile rover. Interestingly, a subsystem of the present invention will be seen to capture the image of a moving mobile rover within a scene, and to classify the image captured to the rover and to its movement. However, the MPI video system of the present invention, and its subsystem, will be seen to function quite differently than the method and apparatus of Lawton in the detection of motion. The MPI video system of the present invention will be seen to avail itself of multiple two-dimensional video images from each of multiple stationary cameras as are assembled into a three-dimensional video image database (an important element of the present invention). Once the multiple images of the MPI video system of the present invention are available for object, and for object track (i.e., motion), correlation(s), then it will prove a somewhat simpler matter to detect motion in the MPI video system of the present invention than in prior art single-perspective systems such as that of Lawton.

U.S. Pat. No. 5,170,440 to Cox for PERCEPTUAL GROUPING BY MULTIPLE HYPOTHESIS PROBABILISTIC DATA ASSOCIATION is a concept of a computer vision algorithm. Again, the MPI video system of the present invention is privileged to be able to start with much more information than any single-point machine vision system. Recall that the MPI video system of the present invention will be seen to avail itself of multiple two-dimensional video images from each of multiple stationary cameras, and that these multiple two-dimensional images are, moreover, assembled into a three-dimensional video image database.

The general concepts, and voluminous prior art, concerning "machine vision", "(target) classification", and "(target) tracking" are all relevant to the present invention. However, the MPI video system of the present invention—while doing very, very well in each of viewing, classifying and tracking, will be seen to come to these problems from a very different perspective than does the prior art. Namely, the prior art considers platforms—whether they are rovers or warships—that are "located in the world", and that must make sense of their view thereof from essentially but a single perspective centered on present location.

The present invention functions oppositely. It "defines the world", or at least so much of the world is "on stage" and in view to (each of) multiple video cameras. The MPI video system of the present invention has at its command a plethora of correlatable and correlated, simultaneous, positional information. Once it is known where each of multiple cameras are, and are pointing, it is a straightforward matter for the computer processes of the present invention to fix, and to track, items in the scene. In this manner the invention is a rough optical counterpart and analog of the Atlantic Undersea Acoustic Test range for acoustic (sonar) detection, classification and tracking, and is likewise a counterpart and analog to multi-antenna correlated radars such as in the Naval Tactical Data System for electromagnetic (radar) detection, classification and tracking.

The present invention will be seen to perform co-ordinate transformation of (video) image data (i.e., pixels), and to do this during a generation of two- and three-dimensional image databases. U.S. Pat. No. 5,259,037 to Plunk for AUTOMATED VIDEO IMAGERY DATABASE GENERATION USING PHOTOGRAMMETRY discusses the conversion of forward-looking video or motion picture imagery into a database particularly to support image generation of a "top down" view. The present invention does not require any method so sophisticated as that of Plunk, who uses a Kalman filter to compensate for the roll, pitch and yaw of the airborne imaging platform: an airplane. In general the necessary image transformations of the present invention will be seen not to be plagued by dynamic considerations (other than camera pan and zoom)—the multiple cameras remaining fixed in position imaging the scene (in which scene the objects, however, may be dynamic).

Finally, U.S. Pat. No. 5,237,648 to Cohen for an APPARATUS AND METHOD FOR EDITING A VIDEO RECORDING BY SELECTING AND DISPLAYING VIDEO CLIPS shows and discusses some of the concerns, and desired displays, presented to a human video editor. In the MPI video system of the present invention much of this function will be seen to be assumed by hardware.

The system of present invention will be seen to, in its rudimentary embodiment, perform a spatial positional calibration of each of multiple video cameras from the images produced by such cameras because, quite simply, in the initial test data the spatial locations of the cameras were neither controlled by, nor even known to, the inventors. This is not normally the case, and the multi-perspective video or the present invention normally originates from multiple cameras for which (i) the positions, and (ii) the zoom in/zoom out parameters, are well known, and fully predetermined, to the system. However, and notably, prior knowledge of camera position(s) may be "reverse engineered" by a system from a camera(s') image(s). Two prior art articles so discussing this process are "A Camera Calibration Technique using Three Sets of Parallel Lines" by Tomino Echigo appearing in *Machine Visions and*

*Applications*, 3; 139–167 (1990); and "A theory of Self-Calibration of a Moving Camera" by S. J. Maybank and O. D. Faugeras appearing in *International Journal of Computer Vision* 8: 2; 123–151 (1992).

In general, many computer processes performed in the present invention are no more sophisticated than are the computer processes of the prior art, but they are, in very many ways, often greatly more audacious. The present invention will be seen to manage a very great amount of video data. A three-dimensional video model, or database is constructed. For any sizable duration of video (and a sizable length thereof may perhaps not have to be retained at all, or at least retained long), this database is huge. More problematical, it takes very considerable computer "horsepower" to construct this database—howsoever long its video data should be held and used.

However, the inventors having taken a major multi-media laboratory at a major university and "rushed in where angels fear to tread" in attempting to develop a form of video presentation that is believed to be wholly new, the inventors have found the "ground" under their invention to be firmer, and the expected problems more tractable, than expected. In particular the inventors have found—a few strategic simplifications being made—that presently-available computer and computer systems resources can produce usable results in an MPI video system. Such is the story of the following sections.

SUMMARY OF THE INVENTION

1. Summary of the Function of the Invention

The present invention contemplates making each and any viewer of a video or a television scene to be his or her own proactive editor of the scene, having the ability to interactively dictate and select—in advance of the unfolding of the scene, and by high-level command—a particular perspective by which the scene will be depicted, as and when the scene unfolds.

The viewer can command the selection of real, or—in advanced embodiments of the invention—even the synthesis of virtual, video images of the scene in response to any of his or her desired and selected (i) spatial perspective on the scene, (ii) static or dynamically moving object appearing in the scene, or (iii) event depicted in the scene. The viewer—any viewer—is accordingly considerably more powerful than even the broadcast video editor of, for example, a live sporting event circa 1995. The viewer is accorded the ability to (i) select in advance a preferred video perspective of view as optionally may be related to dynamic object movements and/or to events unfolding in the scene, and even, as the ultimate extension of the invention, (ii) to synthesize video views where no real video camera even exists.

For example, in accordance with the present invention a viewer of an American football game on video or on television can command a consistent "best" view of (i) one particular player, or, alternatively (ii) the football itself as will be, from time to time, handled by many players. The system receives and processes multiple video views (images) generally of the football field, the football and the players within the game. The system classifies, tags and tracks objects in the scene, including static objects such as field markers, and dynamically moving objects such as the football and the football players. Some of the various views (images) will at times, and from time to time, be "better"—by various criteria—in showing certain things than are other views.

In the rudimentary embodiment of the invention taught within this specification the system will consistently, dynamically, select and present a single "best" view of the selected object (for example, the football, or a particular player). This will require, and the system will automatically accomplish, a "handing off" from one camera to another camera as different ones of multiple cameras best serve to image over time the selected object. In the ultimate extension of the present invention, the viewer can ask to be shown a synthesized video view, such as from a perspective constantly positioned behind a certain offensive running back, where no real video camera actually exists.

The system of the invention is powerful (i) in accepting viewer specification at a high level of those particular objects and/or events in the scene that the user/viewer desires to be shown, and (ii) to subsequently identify and track all user/viewer-selected objects and events (and still others for other users/viewers) in the scene.

The system of the present invention can also, based on its scene knowledge database, serve to answer questions about the scene.

Finally, the system of the present invention can replay events in the scene from the same perspective, or from selected new perspectives, depending upon the desires of the user/viewer. It is not necessary for the user/viewer to "find" the best and proper image; the system performs this function. For example, if the user/viewer wants to see how player number twenty (#20) came to make an interception in the football game, then he or she could order a replay of the entire down focused on player number twenty (#20).

For example, and continuing with the example of an American football game, an individual viewer can ask questions like: Who is the particular player shown marked by my cursor? Where is player Mr. X? Where is the football?

In advanced, image-synthesizing, embodiments of the system of the present invention, the user/viewer can generate commands like: "replay for me at ½ speed the event of the fumble as shown from a straight overhead view". Such commands are honored by the system of the present invention even though no real video camera may, in actuality, exist at this precise overhead location.

2. Summary of the Method and System In Implementation of the Invention

The present invention contemplates selecting real, or—in advanced embodiments—synthesizing virtual, video/television images of a scene from multiple real video/television images of the scene, particularly so as to select or to synthesize video/television images that are linked to any such (i) spatial perspective(s) on the scene, (ii) object(s) in the scene, or (iii) event(s) in the scene, as are selectively desired by a user/viewer to be shown.

The method of the invention is directed to presenting to a user/viewer a particular, viewer-selected, two-dimensional video image of a real-world, three-dimensional, scene. In order to do so, multiple video cameras, each at a different spatial location, produce multiple two-dimensional images of the real-world scene, each at a different spatial perspective. Objects of interest in the scene are identified and classified in these two-dimensional images. These multiple two-dimensional images of the scene, and their accompanying object information, are then combined in a computer into a three-dimensional video database, or model, of the scene. The database is called a model because it incorporates information about the scene as well as the scene video. It incorporates, for example, a definition, or "world view", of the three-dimensional space of the scene. The model of a football game knows, for example, that the game is played upon a football field replete with static, fixed-position, field yard lines and hash mark markings, as well as of the existence of the dynamic objects of play. The model is, it will be seen, not too hard to construct so long as there are, or are made to be, sufficient points of reference in the imaged scene. It is, conversely, almost impossible to construct the 3-D model, and select or synthesize the chosen image, of an amorphous scene, such as the depths of the open ocean. (Luckily, viewers are generally more interested in people in the world than in fish.)

The computer also receives from a prospective user/viewer of the scene a user/viewer-specified criterion relative to which criterion the user/viewer wishes to view the scene.

From the (i) 3-D model and (ii) the criterion, the computer produces a particular two-dimensional image of the scene that is in accordance with the user/viewer-specified criterion. This particular two-dimensional image of the real-world scene is then displayed on a video display to the user/viewer.

At the highest-level, the description of the previous paragraphs regarding the method of the present invention, and the computer-based system performing the method, may not seem much different in effect than that prior art system presently accorded, say, a network sports director who is able to select among many video feeds in accordance with his (or her) own "user/viewer-specified criterion". The significance of the production of the three-dimensional video model (of the real-world scene) by the method, and in the system, of the present invention is, at this highest level of describing the system's functions, as yet unclear. Consider, then, exactly what flows from the method, and the system, of the present invention that produces and uses a three-dimensional video model.

First, the computer may ultimately produce, and the display may finally show, only such a particular two-dimensional image of the scene—in accordance with the user/viewer-specified criterion—as was originally one of the images of the real-world scene that was directly imaged by one of the multiple video cameras. This is, indeed, the way the rudimentary embodiment of the invention taught and shown herein functions. At first consideration, this automatic camera selection may seem unimpressive. However, consider not only that the user/viewer criterion is specifiable at a high level, but that the appropriate, selected, scene image may change over time in accordance with just what is imaged, and in what location(s), by which camera(s), and in accordance with just what transpires in the scene. In other words, the evolving contents of the scene, as the scene is imaged by the multiple cameras and as it is automatically interpreted by the computer, determine just what image of the scene is shown at any one time, and just what sequence of images are shown from time to time, to the user/viewer. Action in the scene "feeds back" on how the scene is shown to the viewer!

Second, in advanced embodiments of the system, the computer is not limited to selecting from the three-dimensional model a two-dimensional image that is, or that corresponds to, any of the images of the real-world scene as was imaged by any of the multiple video cameras. Instead, the computer may synthesize from the three-dimensional model a completely new two-dimensional image that is without exact equivalence to any of the images of the real-world scene as have been imaged by any of the multiple video cameras.

Third, the user/viewer-specified criterion may be of a particular spatial perspective relative to which the user/viewer wishes to view the scene. This spatial perspective need not be immutably fixed, but can instead be linked to a dynamic object in the scene. In the case of generating a scene view from a user/viewer-specified spatial perspective, the computer produces from the three-dimensional model a particular two-dimensional image of the scene that is in best accordance with some particular spatial perspective criterion that has been received from the viewer. The particular two-dimensional image of the scene that is generated and displayed may, or may not, be, or be equivalent to, any real image of the scene as was obtained by any of the video cameras. In other words, in advanced embodiments of the invention the scene image shown may be a virtual image. Even if the image shown is a real image, the computer will still automatically select, and the display will still display, over time, those actual images of the scene as are imaged, over time, by different ones of the multiple video cameras. Automated scene switching, especially in relation to dynamic objects in the scene, is not known to the inventors to exist in the prior art.

Fourth, the user/viewer-specified criterion may be of a particular object in the scene. In this case the computer will combine the images from the multiple video cameras not only so as to generate a three-dimensional video model of the scene, but so as to generate a model in which objects in the scene are identified. The computer will subsequently produce, and the display will subsequently show, the particular image—whether real or virtual—appropriate to best show the selected object. Clearly this is a feedback loop: the location of an object in the scene serves to influence, in accordance with a user/viewer selection of the object, how the scene is shown. Clearly the same video scene could be, if desired, shown over and over, each time focusing view on a different selected object in the scene.

Moreover, the selected object may either be static, and unmoving, or dynamic, and moving, in the scene. Regardless of whether the object in the scene is static or dynamic, it is preferably specified to the system by the user/viewer by act of positioning a cursor on the video display. The cursor is a special type that unambiguously specifies an object in the scene by an association between the object position and the cursor position in three dimensions, and is thus called "a three-dimensional cursor".

Fifth, the criterion specified by the user/viewer may be of a particular event in the scene. In this case the computer will again combine the images from the multiple video cameras not only so as to generate a three-dimensional video model of the scene, but so as to generate a model in which one or more dynamically occurring event(s) in the scene are recognized and identified. The computer will subsequently produce, and the display will show, a particular image—whether real or virtual—that is appropriate to best show the selected event. Clearly this is again a feedback loop: the location of an event in the scene influences, in accordance with a viewer selection of the event, how the scene is shown.

Sixth, and finally, the method of the invention may be performed in real time as interactive television. The television scene will be presented to a user/viewer interactively in accordance with the user/viewer-specified criterion.

These and other aspects and attributes of the present invention will become increasingly clear upon reference to the following drawings and accompanying specification.

BRIEF DESCRIPTION OF THE DRAWINGS

FIGS. 17a through 17d are four pictorial views of the campus courtyard previously diagrammed in FIG. 14 at global time 00:22:29:06; the scene containing four moving objects including a vehicle, two walkers and a bicyclist.

FIGS. 19a through 19e are five pictorial views of the GM-PPS model showing various hypotheses corresponding to the four moving objects in the scene of FIG. 17 at global time 00:22:29:06; FIGS. 19a–19d correspond to four actual camera views while FIG. 19e shows a virtual image from the top of the scene.

FIGS. 20a through 20d are four pictorial views of the same campus courtyard previously diagrammed in FIG. 14, and shown in FIG. 17, at global time 00:62:39:06; the scene still containing four moving objects including a vehicle, two walkers and a bicyclist.

DESCRIPTION OF THE PREFERRED EMBODIMENT

Figure 1:
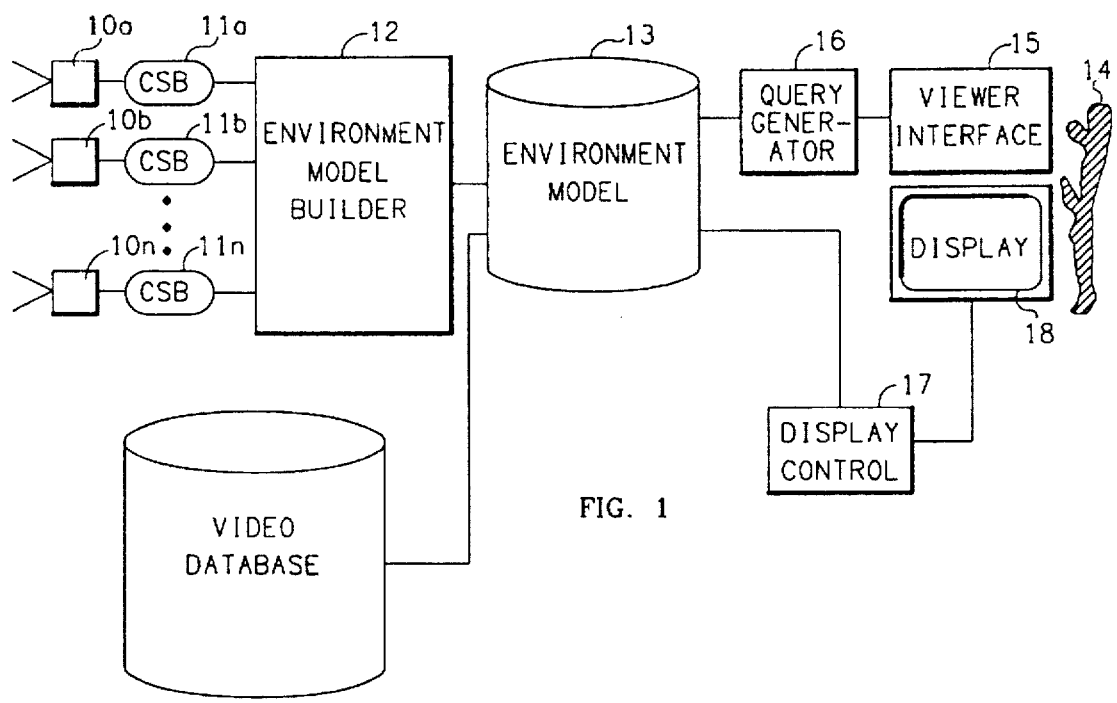
FIG. 1 is a top-level block diagram showing the high level architecture of the system for Multiple Perspective Interactive (MPI) video in accordance with the present invention.

1. Capabilities of the Multiple Perspective Interactive Video of the Present Invention, and Certain Potential Implications of These Capabilities The capabilities of the Multiple Perspective Interactive (MPI) video of the present invention are discussed even prior to teaching the system that realizes these capabilities in order that certain potential implications of these capabilities may best be understood. Should these implications be understood, it may soon be recognized that the present invention accords not merely a "fancy form" of video, but an in-depth change to the existing, fundamental, video and television viewing experience.

The present specification presents a system, a method and a model for Multiple Perspective Interactive—"MPI"— video or television. In the MPI video model multiple cameras are used to acquire an episode or a program of interest from several different spatial perspectives. The cameras are real, and exist in the real world: to use a source camera, or a source image, that is itself virtual constitutes a second-level extension of the invention, and is not presently contemplated.

MPI video is always interactive—the "I" in MPI—in the sense that the perspective from which the video scene is desired to be, and will be, shown and presented to a viewer is permissively chosen by such viewer, and predetermined. However, MPI video is also interactive in that, quite commonly, the perspective on the scene is dynamic, and responsive to developments in the scene. This may be the case regardless that the real video images of the scene from which the MPI video is formed are themselves dynamic and may, for example, exhibit pan and zoom. Accordingly, a viewer-selectable dynamic presentation of dynamic events that are themselves dynamically imaged is contemplated by the present invention.

Consider, for example, the presentation of MPI video for a game of American football. The "viewer-selectable dynamic presentation" might be, for example, a viewer-selected imaging of the quarterback. This image is dynamic in accordance that the quarterback should, by his movement during play, cause that, in the simplest case, the images of several different video camera should be successively selected or, in the case of such full virtual video as is contemplated by the present invention, that the quarterback's image should be variously dynamically synthesized by digital computer means. The football game is, of course, a dynamic event wherein the quarterback moves. Finally, the real-world source, camera, images that are used to produce the MPI video are themselves dynamic in accordance that the cameramen at the football game attempt to follow play.

The net effect of all this dynamism is non-obvious, and of a different order than even such video, or television, experience as is commonly accorded a network video director of a major sporting event who is exposed to a multitude of (live) video feeds. The experience of MPI video in accordance with the present invention may usefully be compared, and contrasted, with virtual reality. The term "virtual reality" commonly has connotations of (i) unreality, (ii) sensory immersion, and/or (iii) self-directed interaction with a reality that is only fantasy, or "virtual". The effect of the MPI video of the present invention differs from &virtual reality" in all these factors, but is nonetheless quite shocking.

In the first place, the present invention is not restricted to use with video depicting reality—but reality is the cheapest source of such information as can, when viewed through the MPI video system of the present invention, still be quite "intense". In other words, it may be necessary to be attacked by a fake, virtual, tiger when one can visually experience the onrush of a real hostile football linebacker.

In the second place, MPI video is presented upon a common monitor, or television set, and does not induce the viewer to believe that he or she has entered a fantasy reality.

Finally, and in the third place, the self-directed interaction with MPI video is directed to observational perspective, and not to a viewer's dynamic control of developments in the scene in accordance with his or her action, or inaction.

What MPI video can do, and what causes it to be "shocking", is that the viewer can view, or, in the American vernacular, "get into", the video scene just where, and even when, the viewer chooses. Who at a live sporting event has not looked at the cheerleaders, a favorite player, or even the referee? Psychological and sociological research has shown that, among numerous other differences between us all, men and women, as one example, do not invariably visually acquire the same elements of a picture or painting, let alone do the two sexes visually linger on such elements as they identify in common for equal time durations. (Women like to look at babies in a scene more so than do men, and men like to look at women in a scene more so than do women.) Quite simply, humans often have different interests, and focal points of interest, even in the same visual subject matter. With present video and television presentations everyone must watch the same thing, a "common composite". With the viewer-interactive control that is inherent in MPI video, different things can be differently regarded at each viewer's behest. Accordingly, MPI video removes some of the limitations that presently make a video or a television viewer only a passive participant in the video or television viewing process (in the American vernacular, a "couch potato").

Of course, MPI video need not be implemented for each and every individual video or television viewer in order to be useful. Perhaps with the advent of communicating 500 channels of television to the home, a broadcast major American football game might reasonably consume not one, but 25+ channels—one for each player of both sides on the football field, one for each coach, one for the football, and one for the stadium, etc.

En early alternative may be MPI video on pay per view. It has been hypothesized that the Internet, in particular, may expand in the future to as likely connect smart machines to human users, and to each other, as to communicatively interconnect more and more humans, only. Customized remote viewing can certainly be obtained by assigning every one his or her own remotely-controllable TV camera, and robotic rover. However, this scheme soon breaks down. How can hundreds and thousands of individually-remotely-controlled cameras jockey for position and for viewer-desired vantage points at a single event, such as the birth of a whale, or an auto race? It is likely a better idea to construct a comprehensive video image database from quality images obtained from only a few strategically positioned cameras, and to then permit universal construction of customized views from this database, all as is taught by the present invention.

As will additionally be seen, the MPI video of the present invention causes video databases to be built in which databases are contained—dynamically and from moment to moment (frame to frame)—much useful information that is interpretive of the scene depicted. Clearly, in order to select, or to synthesize, an image of a particular player, the MPI video system contains information of the player's present whereabouts, and image. It is thus a straightforward matter for the system to provide information, in the form of text or otherwise, on the scene viewed, either continuously or upon request.

Such auxiliary information can augment the entertainment experience. For example, a viewer might be alerted to a changed association of a football in motion from a member of a one team to a member of the opposing team as is recognized by the system to be a fumble recovery or interception. For example, a viewer might simply be kept informed as to which player presently has possession of the football.

The more probable use of such auxiliary information is education. It will no longer be necessary to remain in confused ignorance of what one is viewing if, by certain simple commands, "helps" to understanding the scene, and the experience, may be obtained.

2. An Actual System Performing Multiple Perspective Interactive (MPI) Video in Accordance With the Present Invention, and Certain Limitations of this Exemplary System The MPI video model, its implementation, and the architectural components of a rudimentary system implementing the model are taught in the following sections 3 through _ of this specification. Television is a real-time version of MPI video. Interactive TV is a special case of MPI video. In MPI TV, many operations must be done in real time because many television programs are broadcast in real time.

The concept of MPI video is taught in the context of a sport event. The MPI video model allows a viewer to be active; he or she may request a preferred camera position or angle, or the viewer may even ask questions about contents described in the video. Even the rudimentary system automatically determines the best camera and view to satisfy the demands of the viewer.

Videos of American football have been selected as the video source texts upon which the performance of MPI video will be taught and demonstrated. Football video already in existence was retrieved, and operated upon as a sample application of MPI video in order to demonstrate certain desirable features.

The particular, rudimentary, embodiment of an MPI video system features automatic camera selection and interaction using three-dimensional cursors. The complete computational techniques used in the rudimentary system are not fully contained herein this specification in detail because, by an large, know techniques hereinafter referred to are implemented. Certain computational techniques are, however, believed novel, and the mathematical basis of each of these few techniques are fully explained herein.

The rudimentary, demonstration, system of the present invention has been reduced to operative practice, and ell drawings or photographs of the present specification that appear to be of video screens are representations or photographs of actual screens, and are not mock-ups. Additionally, where continuity between successive video views is implied, then this continuity exists in reality although, commensurate with the amount of computer resource and computational power harnessed to do the necessary transformations, the successive and continuous views and presentations may not be in full real time.

The running MPI video system is presently being extend to other applications besides American football. In particular, a detail teaching of the concept, and method, of generating a three-dimensional database required by the MPI video system of the present invention is taught and demonstrated in this specification not in the context of football, but rather, as a useful simplification, in the context of a university courtyard though which human and machine subjects (as opposed to football players) roam. The present specification will accordingly be understood as being directed to the enabling principles, construction, features and resulting performance of rudimentary embodiment of an MPI video system, as opposed to presenting great details on any or all of the several separate aspects of the system.

3. Architecture of the MPI Video System

A physical phenomena or an event can be usually viewed from multiple perspectives. The ability to view from multiple perspectives is essential in many applications. Current remote viewing via video or television permits viewing only from one perspective, and that perspective being that of an author or editor and not of the viewer. A viewer has no choice. However, remote viewing via video or television even under such limitations has been very attractive and has influenced our modern society in many aspects.

Technology has now advanced to the state that each of many simultaneous remote viewers (i) can be provided with a choice to so view remotely from whatever perspective they want, and, with limitations, (ii) can interactively select just what in the remote scene they want to view.

Let us assume that an episode is being recorded, or being viewed in real time. This episode could be related, for example, to a scientific experiment, an engineering analysis, a security post, a sports event, or a movie. In a simplest and most obvious case, the episode can be recorded using multiple cameras strategically located at different points. These cameras provide different perspectives of the episode. Each camera view is individually very limited. The famous parable about an elephant and the blind men may be recalled. With just one camera, only a narrow aspect of the episode may be viewed. Like a single blind man, a single camera is unable to provide a global description of an episode.

Using computer vision and related techniques in accordance with the present invention, it is possible to take individual camera views and reconstruct an entire scene. These individual camera scenes are then assimilated into a model that represents the complete episode. This model is called an "environment model". The environment model has a global view of the episode, and it also knows where each individual camera is. The environment model is used in the MPI system to permit a viewer to view what he or she wants from where he or she wants (within the scene, and within limits).

Assume that a viewer is interested in one of the following.

First, the viewer may be interested in a specific perspective, and may want to view a scene, an episode, or an entire video presentation from this specific perspective. The user may specify a real, or a virtual, camera specifically. Alternatively, the viewer may only specify the desired general location of the camera, without actual knowledge whether a camera in such location would be real or virtual.

Second, the viewer may be interested in a specific object. There may be several objects in a scene, an episode, or a presentation. A viewer may want to always view a particular object independent of its situation in the scene, episode, or presentation. Alternatively, the object that is desired to be viewed may be context sensitive: the viewer may desire view the basketball until the goal is scored to then shift view to the last player to touch the basketball.

Third, the viewer may be interested in a specific event. A viewer may specify characteristics of an event and may want to view a scene, an episode, or a presentation from the best perspective for that event.

Fourth, the viewer may be interested in a having a view from a virtual camera. The viewer may request to view a scene of an event within the scene from a perspective that is not provided by any real camera that is situated to acquire the scene or any portion thereof. In such cases, the MPI video system of the present invention will, by use of the environment model and video synthesis techniques, synthesize a virtual camera, and video image, so as to view a scene, an episode, or an entire presentation from a viewer-specified perspective.

The high level architecture for a MPI video system so functioning is shown in a first level block diagram in FIG. 1. A image at a certain perspective from each camera 10a, 10b, ... 10n is converted to its associated camera scene in camera screen buffers CSB 11a, 11b, ... 11n. Multiple camera scenes are then assimilated into the environment model 13 by computer process in the Environ. Model Builder 12. A viewer 14 (shown in phantom line for not being part of the MPI video system of the present invention) can select his perspective at the Viewer Interface 15, and that perspective is communicated to the Environment Model via a computer process in Query Generator 16. The programmed reasoning system in the Environment Model 13 decides what to send via Display Control 17 to the Display 18 of the viewer 14.

Implementation of a universal, plug and play, MPI video system that (i) track virtually anything, (ii) function in real time (i.e, for television), and/or (iii) produce virtually any desired image, including a full virtual image, severely stresses modern computer and video hardware technology circa 1995, and can quickly come to consume the processing power of a mini-supercomputer. Economical deployment of the MPI video system requires, circa 1995, advances in several hardware technology areas. Notably, however, there is, as will imminently be demonstrated, no basic hardware nor software function required by such a MPI video system that ms not only presently realizable, but that is, in actual fact, already realized. Moreover, a relatively high level, user friendly, viewer interface—which might have been considered impossible or extremely difficult of being successfully achieved—"falls out" quite naturally, and to good effect, from the preferred implementation of, and the partitioning of function within, the MPI system.

A complete MPI video system with limited features can be, and has been, implemented using the existing technology. The exact preferred architecture of a MPI video system will depend on the area to which the system is intended to be applied, and the t}pe and level of viewer interaction allowed. However, certain general issues are in common to any and all implementations of MPI video systems. Seven critical areas that must be addressed in building any MPI video system are as follows.

First, a camera scene builder is required as a programmed computer process. In order to convert an image sequence of a camera to a scene sequence, the MPI video system must, and does, know where the camera is located, its orientation, and its lens parameters. Using this information, the MPI video system is then able to locate objects of potential interest, and the locations of these objects in the scene. This requires powerful image segmentation methods. For structured applications, the MPI video system may use some knowledge of the domain, and may even change or label objects to make its segmentation task easier. This is, in fact, the approach of the rudimentary embodiment of the MPI video system, as will be further discussed later.

Second, an environment model builder is required as a programmed computer process. Individual camera scenes are combined in the MPI video system to form a model of the environment. All potential objects of interest and their locations are recorded in the environment model. The representation of the environment model depend on the facilities provided to the viewer. If the images are segmented properly, then, by use of powerful but known computers and computing methods, it is possible to build environment models in real time, or almost in real time.

Third, a viewer interface permits the viewer to select the perspective that he or she wants. This information is obtained from the user in a friendly but directed manner. Adequate tools are provided to the user to point and to pick objects of interest, to select the desired perspective, and to specify events of interest. Recent advances in visual interfaces, virtual reality, and related areas have contributed to making the MPI video system viewer interface very powerful—even in the rudimentary embodiment of the system.

Fourth, a display controller software process is required to respond to the viewers' requests by selecting appropriate images to be displayed to each such viewer. These images may all come from one perspective, or the MPI video system may have to select the best camera at every point in time in order to display the selected view and perspective. Accordingly, multiple cameras may be used to display a sequence over time, but at any given time only a single best camera is used. This has required solving a camera hand-off problem.

Fifth, a video database must be maintained. If the video event is not in real time (i.e., television) then, then it is possible to store an entire episode in a video database. Each camera sequence is stored along with its metadata. Some of the metadata is feature based, and permits content-based operations. See Ramesh Jain and Arun Hampapur; "Metadata for video-databases" appearing in *SIGMOD Records*, Dec. 1994.

In many applications of the MPI video system, environment models are also stored in the database to allow rapid interactions with the system.

Fifth, real-time processing of video must be implemented to permit viewing of real time video events, i.e. television. In this case a special system architecture is required to interpret each camera sequence in real time and to assimilate their results in real time so that, based on a viewer input, the MPI video system can use the environment model to solve the camera selection problem.

A practitioner of the computer arts and sciences will recognize that this sixth requirement is nothing but the fifth requirement performed faster, and in real time. The requirement might just barely be realizable in software if computational parallelism is exploited, but, depending upon simplifying assumptions made, a computer ranging from an engineering work station to a full-blown supercomputer (both circa 1995) may be required. Luckily, low-cost (but powerful) microprocessors are likely distributable to each of the Camera Sequence Buffers CSB 11a, 11b, ... 11n in order to isolate, and to report, features and dynamic features within each camera scene. Correlation of scene features at a higher process level may thus be reduced to a tractable problem. Another excellent way of simplifying the problem—which way is used in the rudimentary embodiment of the TDI video system taught within this specification—is to demand that the scene, and each camera view thereof, include constant, and readily identifiable, markers as a sort of video "grid". An American football field already has this grid in the form of yard lines and hash marks. So might a college courtyard with benches and trees. A whale free swimming in an amorphous tank while giving birth is at the other end of the spectrum, and presents an exceedingly severe camera image selection (if not also correlation) problem.

Seventh, a visualizer is required in those applications that require the displaying of a synthetic image in order to satisfy a viewer's request. For example, it is possible that a user selects a perspective that is not available from any camera. A trivial solution is simply to select the closest camera, and to use its image. The solution of the rudimentary MPI video system of the present specification—which solution is far from trivial in implementation or trite in the benefits obtained—is to select a best—and not necessarily a closest—camera and to use its image and sequence.

The ultimate response of the MPI video system is to synthesize the exact synthetic image, and image sequence, the viewer desires and demands. Even here, no image can be formed where no source image data exists, such as a view from below the playing field (i.e., from in the ground). Even a synthetic view that is normally acceptable, such as "from the nose of the football in the vector direction of the movement of same" cannot be produced when, and at such times as, the football becomes "buried", and obscured from view, under a pile up after the ball carrier is tackled. "Weird" views in synthesized MPI video can be exciting, but, in accordance with their "weirdness", are not always reliably capable of being successfully synthesized.

The ability of an MPI video system to synthesize a full virtual video image is basically a function of "raw" computational power. If real time video (i.e., television) is not required, short virtual video segments of real world occurrences may be quite as reasonably produced, and maybe more reasonably produced, than the computer-generated special effects, including morphing, so popular in American movies circa 1995. Of course, it should be understood that even the synthesis of such segments requires computers of considerable speed capacity.

Clearly, implementation of an MPI video system with unrestricted capability requires state-of-the art computer hardware and software, and will benefit by such improvement in both as are confidently expected. Some new issues, other than the above seven, are expected to arise in addressing different applications of MPI video. At the present time, and in this specification, only a rudimentary MPI vide system is taught. By implementing this first MPI video system, the inventors have identified interesting future issues in each of computer vision, artificial intelligence, human interfaces, and databases. However, and for the moment, the following sections serve to discuss and teach an actual MPI video system that was implemented to demonstrate the concept of the invention more concretely and completely, as well as to define and identify performance issues.

4. A Rudimentary, Prototype, Embodiment of an MPI Video System in Use for Producing MPI Video of American Football Key concepts in MPI video are taught in this section 4. by reference to a rudimentary, prototype, embodiment of an MPI video system that was built particularly for multiple perspective interactive viewing of American football. The motivation of the inventors in selecting this domain was to find a domain that was realistic, interesting, non-trivial and sufficiently well structured so as to demonstrate many important concepts of MPI video. It is also of note that, should the present MPI video system be applied commercially, it might already be possessed of such characteristics as would seemingly make it of some practical use in certain applications such as the "instant replay".

Many other sports and many other applications were considered by the inventors. American football was chosen due to the several attributes of the game that make it highly structured both from (i) database and (ii) computer vision perspective. These issues of structure are hereinafter discussed in the context of the implementation of the rudimentary, prototype, embodiment of the MPI video system 4.1 Scenario of Use, and Required Functions, of an MPI Video System As Applied to American Football Although American-type football games are very popular in North America on conventional television, the broadcasts of these football games have several limitations from a viewer's perspective. The viewing of American football games could seemingly be significantly enhanced by adding the following facilities.

Usually a football game is captured by several cameras that are placed at different locations on the field. Though those cameras cover various parts of the game, viewers can get only one camera view at a time. This view is not a result of viewers' choice, but is instead what an editor thinks most people want to see. In most cases, editor's decision are right. In any case, with the current technology this expert selection of views is seemingly the best that can be done. If a viewer is interested in a certain player, or a shot from a different angle, than he or she cannot see the desired image unless the editor's choice happens to be the same as the viewer's. By giving choices to a viewer, it is anticipated that watching the game might be made significantly more interesting.

Moreover, when watching football game questions often occur to viewers such as "who is this player who just now tackled", or "how long did this player run in this play". Conventional video or television does not necessary provide such information. Tools that provide such information would seemingly be useful.

Still further, while watching a video of a football game, a coach or a player may want to analyze how a particular player ran, or tackled, and to ignore all other players. An interactive viewing system should allow the viewing of only plays of interest, and these from different angles. Moreover, the video would desirably be good enough so that some detailed analysis would be capable of being performed on the video of the plays in order to study the precise patterns, and performance, of the selected player.

In the rudimentary MPI video system, viewers may both (i) select cameras according to their preference, and (ii) ask questions about the name(s), or the movement(s), of players. The following are some examples of interaction between a viewers and the MPI video system The viewer may request that the MPI video system should show a shot of some upcoming play or plays taken from camera located behind the quarterback.

The viewer may request that the MPI video system should show a best shot of a particular, viewer-identified, player.

The viewer may request that the MPI video system should show as text the name of the player to which the viewer points, with his or her cursor, on the screen of the display 18 (shown in FIG. 1).

The viewer may request that the MPI video system should highlight on the screen a particular player whose name the viewer has selected from a player list.

The viewer may request that the MPI video system should show him or her the exact present location of a selected player.

The viewer may request that the MPI video system should show him or her the sequence when a selected player crossed, for example, the 40 yard line.

The viewer may request that the MPI video system should show him or her the event of a fumble.

The viewer may request that the MPI video system should show all third down plays in which quarterback X threw the ball to the receiver Y.

To perform these functions, and others, the MPI video system needs to have information about (i) contents of the football scene as well as (ii) video data.

Some of the above, and several similar questions, are relevant to MPI television, while others are relevant to MPI video. The major distinction between MPI TV and MPI video is in the role of the database. In case of MPI video, it is assume that much preprocessing can transpire, with the pre-processed information stored in a database. In case of MPI TV, most processing must be, and will be, in real time.

In the following section the rudimentary, prototype, MPI system discussed is, remarkably, an MPI TV system. A large random access video database system that is usable as an component of an MPI video system is realizable by conventional means, but is expensive (circa 1995) in accordance with amount of video stored, and the rapidity of the retrieval thereof.

Figure 2:
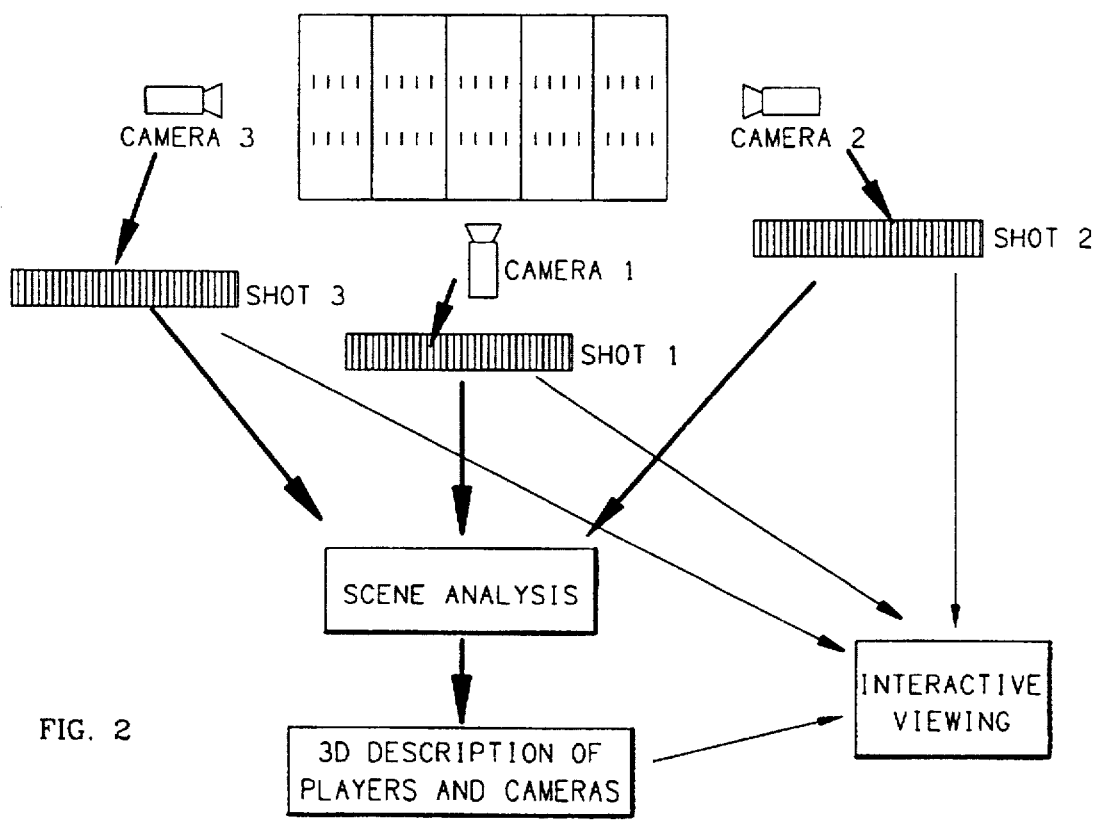
FIG. 2 is a functional block diagram showing an overview of the MPI system in accordance with the present invention, previously seen in block diagram in FIG. 1, in use for interactive football video.

In the rudimentary, prototype, MPI TV system, as shown in FIG. 2, a football scene is captured by several cameras and analyzed by a scene analysis system. The information obtained from individual cameras is used to form the environment model. The environment model allows viewers to interactively view the scene.

Additionally, a prototype football video retrieval system haw been implemented, as hereafter explained, This system incorporates some of the above-listed functions such as automatic camera selection and pointing to players. Other functions are readily susceptible of implementation using the same, existing, hardware and software technologies as are already within the rudimentary embodiment of the system.

4.1.1 Overview of the MPI Football Video/Television System

Figure 3:
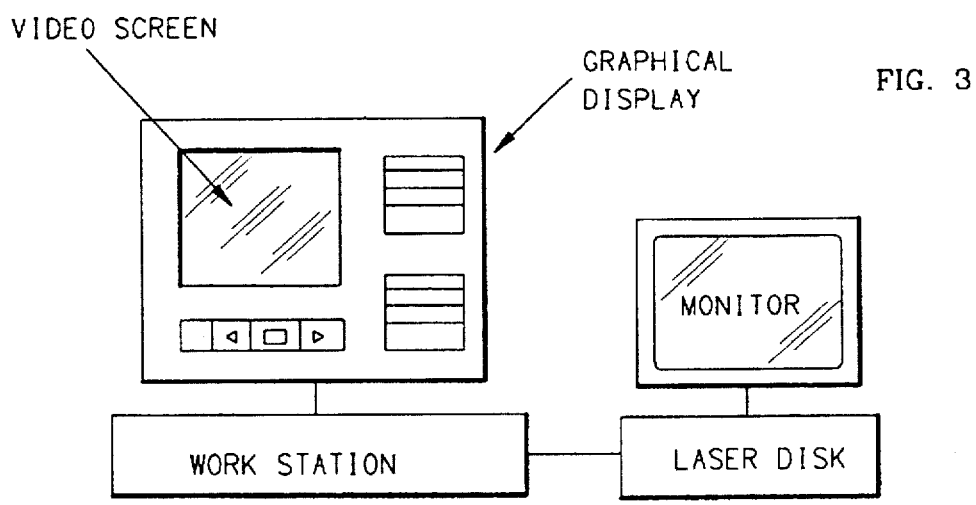
FIG. 3 is a diagrammatic representation of the hardware configuration of the MPI system in accordance with the present invention, previously seen in block diagram in FIG. 1.

The configuration of the MPI football video/television system is shown in FIG. 3. The current system consists of a UNIX workstation, a laser disc player, a video capture board, and a TV monitor and graphical display. The TV monitor is connected to the laser disc player. The laser disc player is controlled by the UNIX workstation. A graphical user interface is built using X-window and Motif on graphical display.

In use of the system, video of a football game was recorded on a laser disc. The actual video recorded was a part of the 1994 Super Bowl game. Since this vide footage was obtained by commercial broadcast, the inventors did not have any control on camera location. Instead, the camera positions were reverse engineered using camera calibration algorithms. See R. M. Haralick and L. G. Shapiro; *Computer and Robot Vision*, Addison-Wesley Publishing, 1993.

Next, selected parts of the Super Bowl football game in which views from three different cameras were shown were selected. The three views were, of course, broadcast at three separate times. They depict an important, and exciting, play in the 1994 Super Bowl game. This selection was necessary to simulate the availability of separate video streams from multiple cameras.

This video data was divided into shots, each of which corresponds to one football play. Each shot was analyzed and a three-dimensional scene description—to be discussed in considerable detail in section 5 hereinafter—was generated. Shots from multiple cameras were combined into the environment model. The environment model contains information about position of players and status of cameras. The environment model is used by the system to allow MPI video viewing to a user. User commands are treated as queries to the system and are handled by the environment model and the database.

Figure 4:
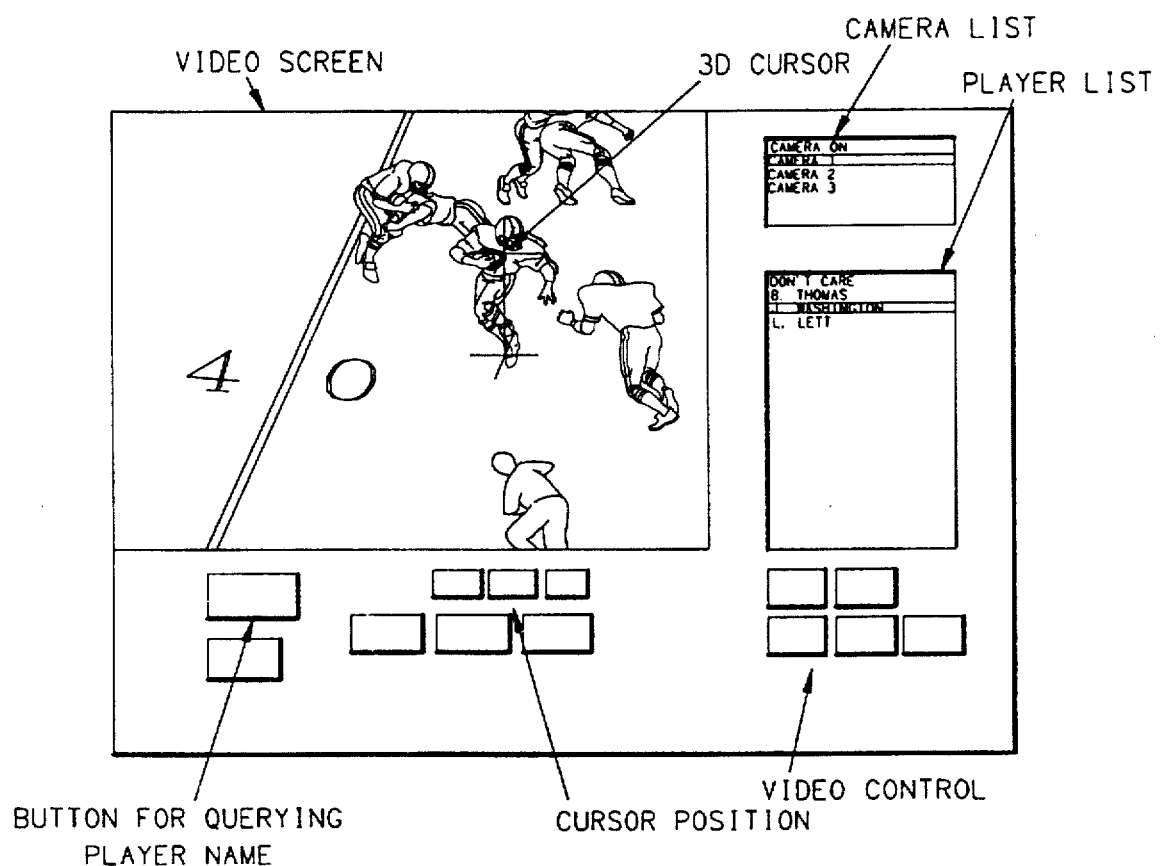
FIG. 4 is a pictorial representation of a video display particularly showing how, as a viewer interface feature of the Multiple Perspective Interactive (MPI) video system in accordance with the present invention previously seen in block diagram in FIG. 1, a viewer can select one of the many items to focus in the scene.

The interactive video interface of the system is shown in FIG. 4. The video screen of FIG. 4 shows video frames taken from laser disc. Video control buttons control video playback. Using a camera list, a viewer can choose any camera. Using a player list, a viewer can choose certain players to be focused on. If a viewer doesn't select a camera, then the system automatically selects the best camera. Also, multiple viewers can interact using the three-dimensional cursor. These new features are described below. Some interface features for the interactive video are shown here. A user can select one of the many items to focus in the scene.

4.2 Automatic Camera Selection

Figure 5:
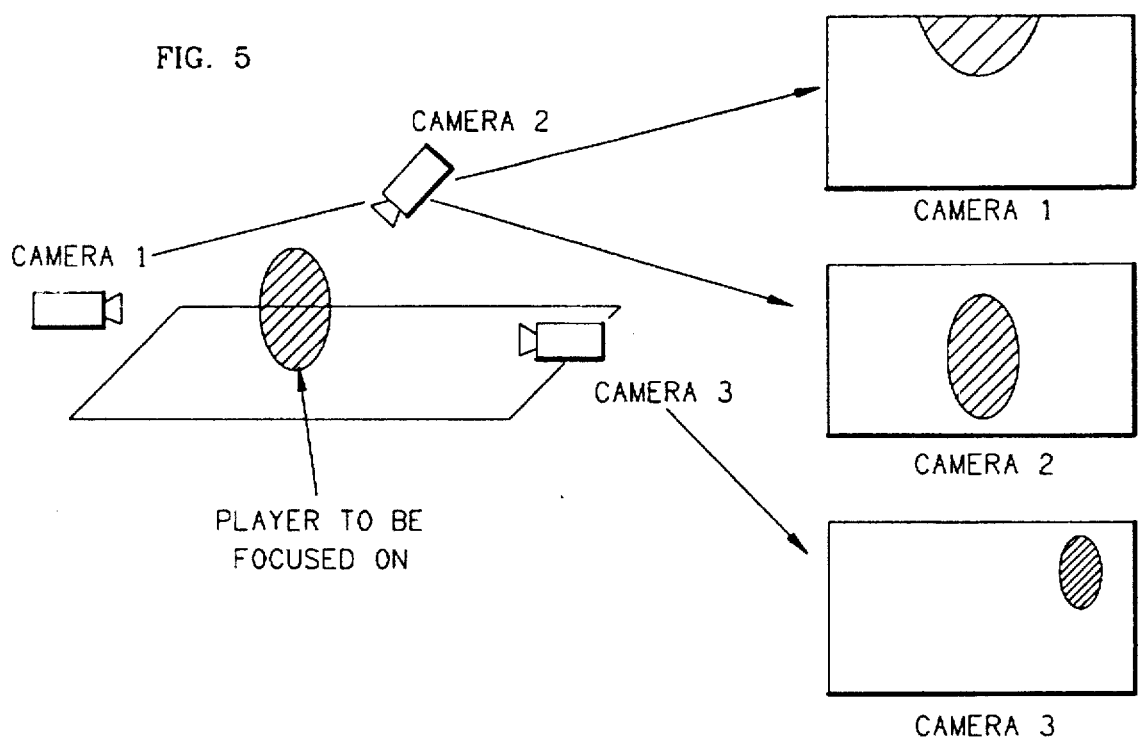
FIG. 5 is a diagrammatic representation showing how different cameras provide focus on different objects in the MPI system in accordance with the present invention; depending on the viewer's current interest an appropriate camera must be selected.

At any moment, there are several cameras that shoot the game. Automatic camera selection is a function that selects the best camera according to the preference of a user. Suppose a player is captured by three cameras and they produce three views shown in FIG. 5. In this case camera 2 is the best to see this player, for in camera 1 the player is out of the area while in camera 3 the player is too small. Different cameras provide focus on different objects. Depending on the current interest, an appropriate camera must be selected.

This function is performed by the system in the following way. First, viewers select the player that they want to see. Then the system looks into information on player position and camera status in the environment model to determine which camera provides the best shot of the player. Finally the selected shot is routed to the screen.

4.3 Interaction Using Three-Dimensional Cursers

In accordance with the present invention, a three-dimensional cursor is introduced in support of the interaction between viewers and the MPI vide/TV system. A three-dimensional cursor is a cursor that moves in three-dimensional space. It is used to indicate particular position in the scene. The MPI video/TV system uses this cursor to highlight players. Viewers also use it to specify players that they want to ask questions about.

Figure 6:
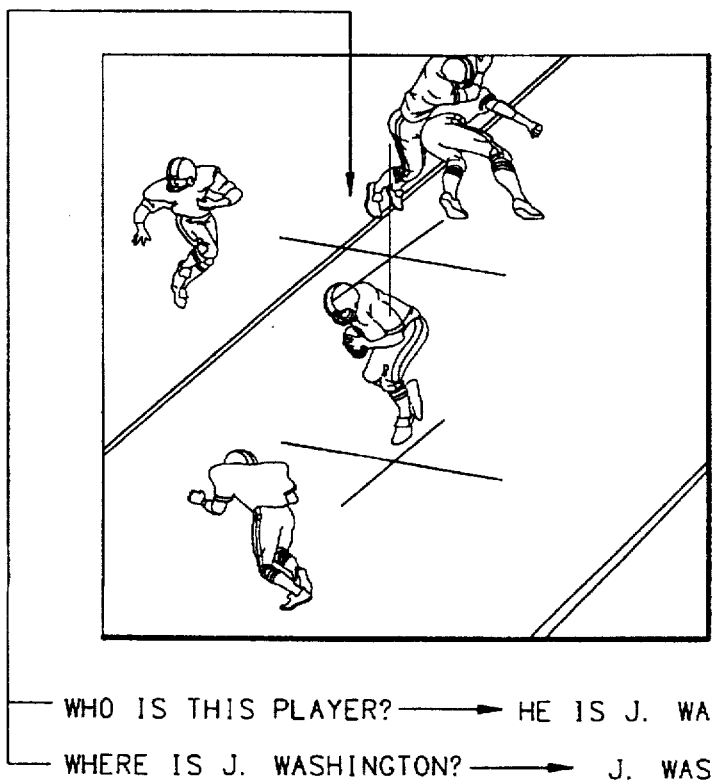
FIG. 6 is another pictorial representation of the video display of the Multiple Perspective Interactive (MPI) video system in accordance with the present invention, this the video display particularly showing a viewer-controlled three-dimensional cursor serving to mark a point in three-dimensional (3-D) space, with the projection of the 3-D cursor being a regular 2-D cursor.

Examples of interaction using three-dimensional cursers are shown in FIG. 6. As shown in FIG. 6, the cursor consists of five lines. Three of the five lines indicate the x, y and z axes of the three-dimensional space. The intersection of these three lines shows cursor position. The other two lines indicate a projection of the three lines onto the ground. The projection helps viewers have a correct information of cursor position.

A viewer can manipulate the three-dimensional cursor so as to mark a point in the three-dimensional space. The projection of the three dimensional cursor is a regular cursor centered at the projection of this marked point.

Both viewers and the MPI system use the three-dimensional cursor to interact with each other. In the first example of FIG. 6, a viewer moves the cursor to the position of a player and asks who this player is. The MPI system then compares the position of the cursor and the present position of each player to determine which player the viewer is pointing.

In the second example of FIG. 6, a viewer tells the MPI system a name of a player and asks where the player is. The MPI system then shows the picture of the player and overlays the cursor on the position of the player so as to highlight the player.

5. Three-dimensional Scene Analysis

The purpose of scene analysis is to extract three-dimensional information from video frames captured by cameras. This process is performed in the following two stages:

First, 2-D information is extracted. From each video frame, feature points such as players and field marks ere extracted and a list of feature points is generated.

Second, 3-D information is extracted. From the two-dimensional description of the video frame, three-dimensional information in the scene, such as player position and camera status, is then extracted.

The details of these extractions are contained within the following sub-sections.

5.1 Extracting Two-dimensional Information

In the extraction of two-dimensional information, feature points are extracted from each video frame. Feature points include two separate items in the images. First, the players are defined by using their feet as feature points. Second, the field marks of the football field are sued as feature points. As is known to fans of American football, and American football field has yard lines to indicate yardage between goal lines, and hash marks to indicate a set distance from the side border, or sidelines, of the field. Field marks are defined as feature points because their exact position as a prior known, and their registration and detection can be used to determine camera status.

In the rudimentary, prototype, MPI system, the feature points are extracted by human-machine interaction. This process is currently carried out as follows. First, the system displays a video frame on the screen of Display 18 (shown in FIG. 1). A viewer, or operator, 14 locates some feature points on the screen and inputs required information for each feature point. The system reads image coordinates of the feature points and generates two-dimensional description.

This process results in two-dimensional description of a video frame that consists of a list describing the players and a list describing the field marks. The player descriptions include each player's name and the coordinates of each player's image. The field mark descriptions include the positions (in the three-dimensional world), and the image coordinates, of all the field marks.

In the rudimentary embodiment of the MPI video system, all feature points are specified interactively with the aid of human intelligence. Many features can be detected automatically using machine vision techniques. See R. M. Haralick and L. G. Shapiro, op cit. The process of automatically detecting features in arbitrary images is not trivial, however. It is anticipated, however, that two trends will help the process of feature point identification in MPI video. First, new techniques have recently been developed, and will likely continue to be developed, that should be useful in permitting the MPI video system to extract feature point information automatically. Future new techniques may include some bar-code like mechanism for each player, fluorescent coloring on the players' helmets, or even some simple active devices that will automatically provide the location of each player to the system. It is also anticipated that many current techniques for dynamic vision and related areas may suitably be adapted for the MPI video application.

Because the goal of the rudimentary, prototype, system ms primarily to demonstrate MPI video, no extensive effort has been made to extract the feature points automatically. Further progress, and greater system capabilities, in this area is deemed straightforward, and susceptible of implementation by a practitioner of the digital video

5.2 Extracting Three-dimensional Information

Figure 7:
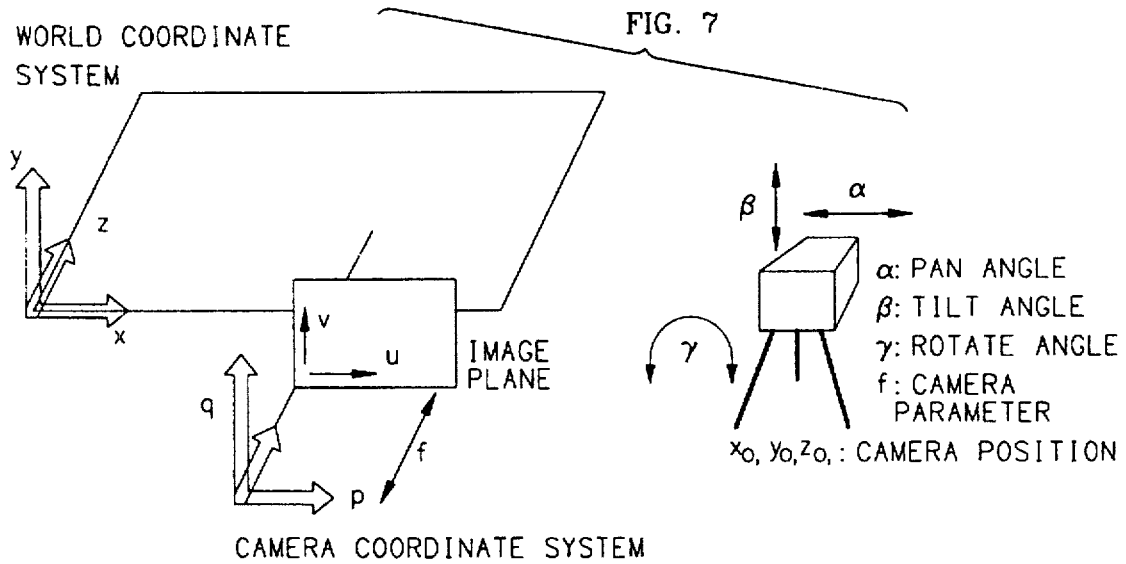
FIG. 7 is a diagram showing coordinate systems for camera calibration in the Multiple Perspective Interactive (MPI) video system in accordance with the present invention.

The purpose of this step is to obtain three-dimensional information from the two-dimensional frames. The spatial relationship between the three-dimensional world and the video frames captured by the cameras is shown in FIG. 7. Consider that a camera is observing a point (x, y, z). A point (u, v) in the image coordinate system to which the point (x, y, z) is mapped may be determined by the following relationships, which relationships comprise a coordinate system for camera calibration.

A point (x, y, z) in the world coordinate system is transformed to a point (p, q, s) in the camera coordinate system by the following equation $$\begin{bmatrix} p \\ q \\ s \end{bmatrix} = R \begin{bmatrix} x - y_0 \\ y - y_0 \\ z - z_0 \end{bmatrix}$$

where R is a transformation matrix from the world coordinate system to the camera coordinate system, and $(x_0, y_0, z_0)$ is the position of the camera.

A point (p,q,s) in the camera coordinate system is projected to point (u,v) on the image plane according to the following equation:

$$\begin{bmatrix} u \\ v \end{bmatrix} = f/s \begin{bmatrix} p \\ q \end{bmatrix}$$

where f is camera parameter that determines the degree of zoom in or zoom out.

Thus, we see that an image coordinate (u,v) which corresponds to world coordinate (x,y,z) is determined depending on the (i) camera position, (ii) camera angle and (ii) camera parameter.

Therefore, from two-dimensional information that is described above, we can obtain three-dimensional camera and player information in the following way. (See R. M. Haralick and L. G. Shapiro; *Computer and Robot Vision*, Addison-Wesley Publishing, 1993.)

First, a camera calibration is performed. If only one known point is observed, a pair of image coordinates and world coordinates may be known. By applying this known pair to the above equations, two equations regarding the seven parameters that determine camera status may be obtained. Observing at least four known points will suffice to provide the minimum equations to solve the seven unknown parameters.

However in the application of the MPI video system to football, the (i) camera position is usually fixed, and (ii) the rotation angle is zero. This reduces the number of unknowns to three, which requires minimum of two known points. The field marks extracted in previous process are then used as known points.

Next, an image to world coordinate mapping is performed. Once the camera status—which is described by the seven parameters above—is known, the world coordinate may be determined from the image coordinate if it considered that the point is constrained to lie in a plane. In the application of the MPI video system to football, the imaged football players are always approximately on the ground. Accordingly, the positions of players can be determined according to the above equations.

5.3 Interpolation

Ideally the scene analysis process just described should be applied to every video frame in order to get the most precise information about (i) the location of players and (ii) the events in the scene. However, it would require significant human and computational effort to do so in the rudimentary, prototype, MPI video system because feature points are located manually, end not by automation. Therefore, one key frame has been manually selected for every thirty frames, and scene analysis has been applied to the selected key frames. For frames in between, player position and camera status is estimated by interpolation between key frames by proceeding under the assumption that coordinate values change linearly between consecutive two key frames.

5.4 Camera Hand-Off

The rudimentary, prototype, MPI video system is able to determine and select a single best camera to show a particular player or an event. This is determined by the system using the environment model. Effectively, for the given player's location, the system uses reverse mapping for given camera locations, and then determines where will the image of the player be in the image for different cameras.

At the present time, the system selects the camera in which the selected player is closest to the center of the viewing area. The system could prospectively be made more precise by considering the orientation of the player also. The problem of transferring display} control from one camera to another is called the "camera hand-off problem".

6. Results of the Exercise of the Rudimentary MPI Video System

The rudimentary, prototype, MPI video system has been exercised on a very simple football scene imaged from three different cameras. The goal of this example is to demonstrate the method and apparatus of the invention, and the feasibility of obtaining practical results. The present implementation and embodiment can clearly be extended to process longer sequences, and also to different applications, and, indeed, is already being so extended.

Figure 8:
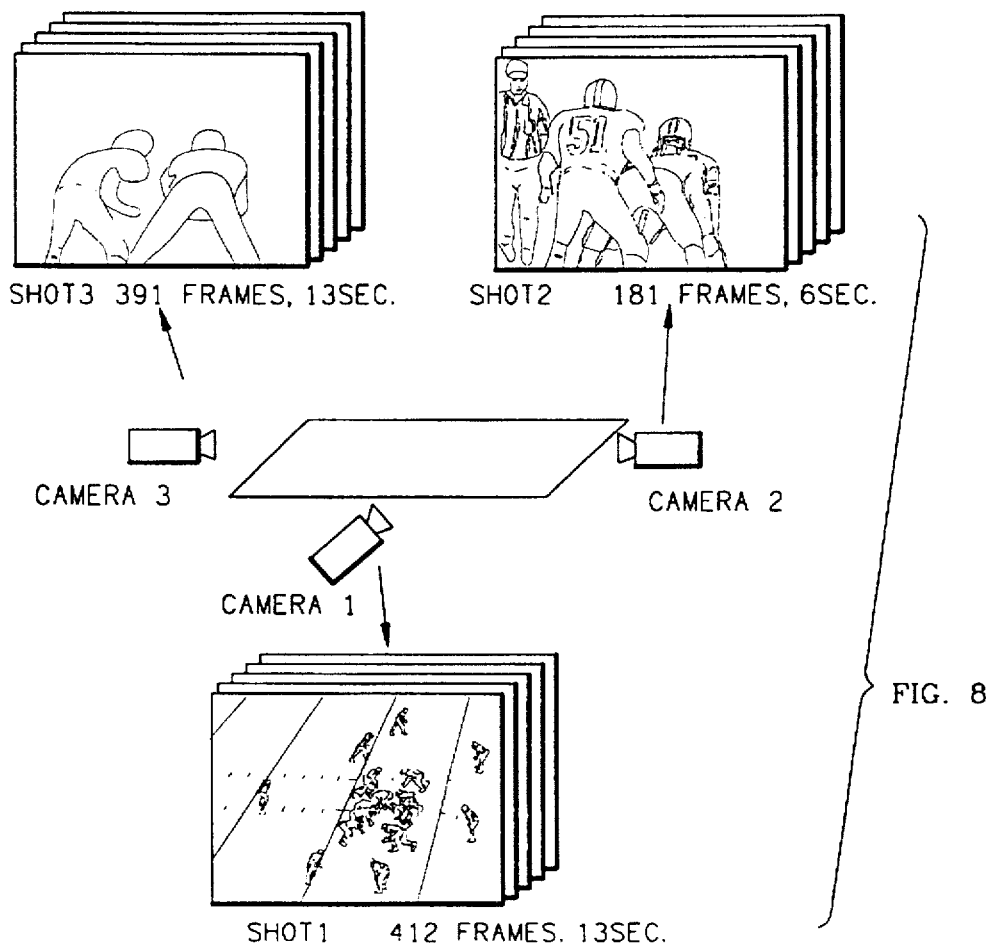
FIG. 8, consisting of FIGS. 8a through 8c, is pictorial representation, and accompanying diagram, of three separate video displays in the Multiple Perspective Interactive (MPI) video system in accordance with the present invention, the three separate displays showing how three different cameras provide three different sequences, the three different sequences being used to build the model of events in the scene.

The actual video data used in the experimental exercise of the MPI video system is shown in FIG. 8. The video data consists of the three shots respectively shown in FIGS. 8a through 8c. These three shots record the same football play but are taken from different camera angles. Each shot lasted about ten seconds. The three different cameras thus provide three separate, but related, sequences. These sequences are used to build the model of events in the scene.

Key frames were selected as previously explained, and scene analysis was applied. In the process of scene analysis, at least three field marks for each key frame. This reference information was subsequently used as known points in order to solve the three unknown parameters that determine camera status. Note that this entire step could be avoided if a priori knowledge of the camera status was available. It is likely that in early, television network, applications of the MPI video system in coverage of structured events like American football that the camera (i) positions and (ii) status parameters will be known, and continuously known, to the MPI video system. To such extent as they are known they obviously need not be calculated.

Figure 9A:
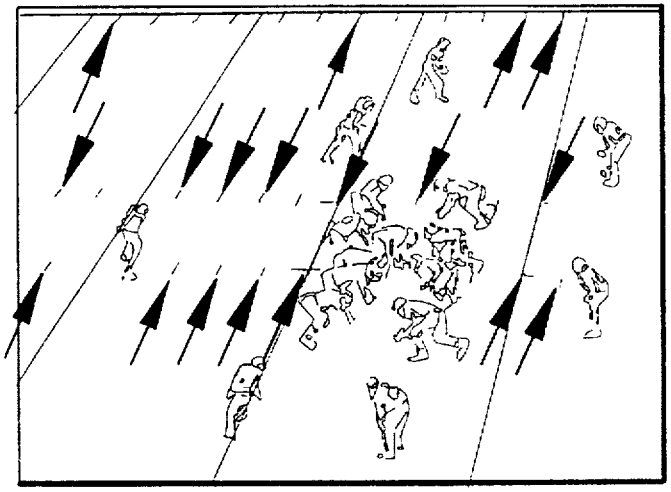
FIGS. 9a and 9b are pictorial representations of two separate video displays in the Multiple Perspective Interactive (MPI) video system in accordance with the present invention showing many known points an image can be used for camera calibration; the frame of FIG. 9a having sufficient points for calibration but the frame of FIG. 9b having insufficient points for calibration.
Figure 9B:
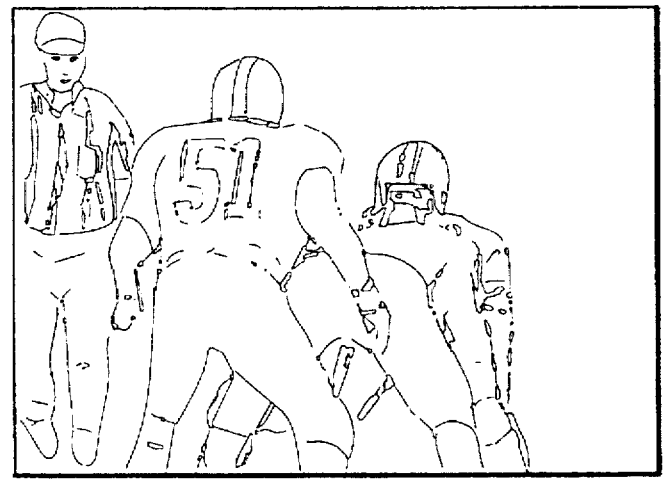

In application of the scene analysis process to the actual video data it was found that not all video frames have enough known points. An example of a video frames that lacks sufficient known points is shown in FIG. 9b. This may be contrasted with a video frame having more than sufficient known points as is shown in FIG. 9a. In the experimental data used, 14 out of 15 key frames from camera 1 had at least three (3) known points, while none of seven (7) key frames from camera 2, and eight (8) out of fourteen (14) key frames from camera 3, had three (3) or more obvious known points. The difference between the cameras was that camera 1 was placed at high position while cameras 2 and 3 were placed at low positions. Accordingly, estimates had to be made for those video frames that didn't show enough obvious known points. The results of such estimations ave not necessarily accurate. Many known points an this image can be used for camera calibration.

Figure 10A:
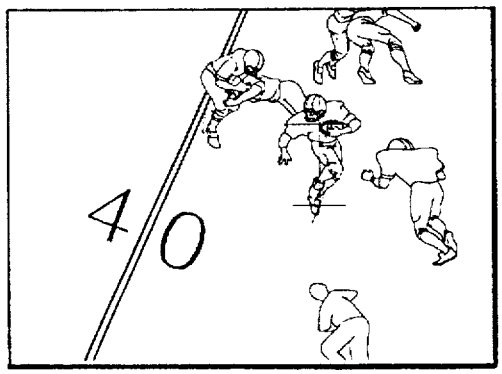
FIGS. 10a through 10c are pictorial representations of three separate video frames, arising from three separate algorithm-selected video cameras, in the Multiple Perspective Interactive (MPI) video system in accordance with the present invention.
Figure 10B:
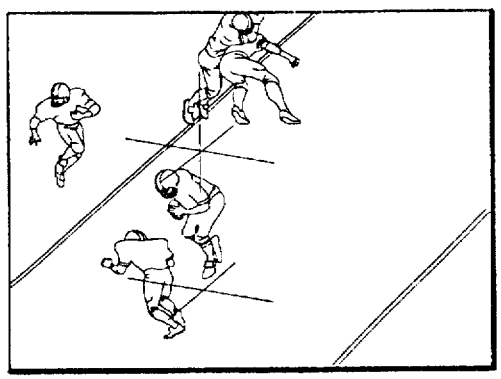
Figure 10C:
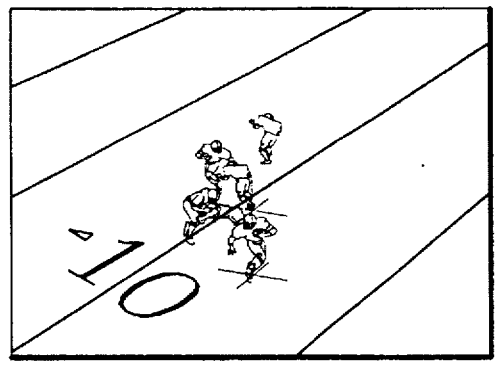

Some examples of actual results obtained by use of the rudimentary, prototype, MPI system are shown in FIG. 10.

These illustrated results were obtained by selecting "Washington" as a player to be focused on. For each video frame, a three-dimensional cursor was overlaid according to the position of "Washington". Regarding these video frames, we see that the results of scene analysis are substantially accurate according to the following observation.

First, the positions of the player "Washington" that a human may read from the video frames are close to the values that the system calculates. The values calculated by the MPI video system are shown below each picture in FIG. 10.

Second, each axis of three-dimensional cursers appears to agree with direction of the football field that a human may read from video frames.

Third, the three-dimensional cursor appear to be close to the chosen player "Washington" in the screen video image.

Other frames were checked as well. It has been confirmed that the results of the MPI video system to isolate, and to track, "target" objects of interest are mostly accurate, at least for those frames that contain enough known points to calibrate.

7. Global Multi-Perspective Perception In the MPI Video System

The present section 7 and following sections 8–10 expound the most conceptually and practically difficult portion of the MPI video system: its capture, organization and processing of real-world events in order that a system action—such as, for example, an immediate selection, or synthesis, of an important video image (e.g., a football fumble, or an interception)—may be predicated on this detection. Until this task is broken down into tractable parts in accordance with the present invention, it may seem to require a solution in the areas of machine vision and/or artificial intelligence, and to be of such awesome difficulty so as to likely be intractable, and impossible of solution with present technology. In fact, it is possible to make such significant progress on this task by use of modern technology applied in accordance with the present invention so as not only to get recognizable results, but so as to get results that are by some measure useful, and arguably even cost effective.

In accordance with the present invention of Multiple Perspective Interactive (MPI) video, an omniscient multi-perspective perception system based on multiple stationary video cameras permits comprehensive live recognition, and coverage, of objects and events in extended environment. The system of the invention maintains a realistic representation of the real-world events. A static model is built first using detailed a priori information. Subsequent dynamic modeling involves the detection and tracking of people and objects in at least portions of the scene that are perceived (by the system, and in real time) to be the most pertinent.

The perception system, using camera hand-off, dynamically tracks objects in the scene as they move from one camera coverage zone to another. This tracking is possible due to several important aspects of the approach of the present invention, including (i) strategic placement of cameras for optimal coverage, (ii) accurate knowledge of scene-camera transformation, and (iii) the constraining of object motion to a known set of surfaces.

In this and the following sections 8–10 of this specification, (i) a description of particularly the novel pattern and event recognition capability of the MPI video system of the present invention, and (ii) certain results presently obtainable with the system, are shown and discussed in the context of a practical implementation of the system on a college campus, to wit: a courtyard of the Engineering School at the University of California, San Diego. This environment is chosen in lieu of—as a possible alternative choice—further discussion of a football field and a football game because (i) it is desired to show more generally how (i) cameras may be strategically placed for optimal coverage, (ii) accurate knowledge facilitates scene-camera transformation, and (iii) object motion may be constrained to a known set of surfaces.

Momentarily considering only (iii) object motion, the exemplary courtyard environment contains (i) one object—a human walker—that follows a proscribed and predetermined dynamic path, namely a walkway path. The exemplary environment contains (ii) still other objects—other human walkers—that do not even know that they are in any of a scene, a system, or an experiment, and who accordingly move as they please in unpredetermined patterns (which are nonetheless earthbound). Finally, the exemplary environment contains (iii) an object—a robot—that is not independent, but which rather moves in the scene in response to static and dynamic objects and events therein, such as to, for example, traverse the scene without running into a static bench or a dynamic human.

It will therefore be recognized that even more is transpiring in the exemplary courtyard environment than on the previously-discussed football field, and that while this exemplary courtyard environment is admittedly arbitrary, it is also very rich in static and dynamic objects important to the exercise and demonstration of an omniscient multi-perspective perception capability of the MPI video system of the present invention.

Figures 11A, 11B:
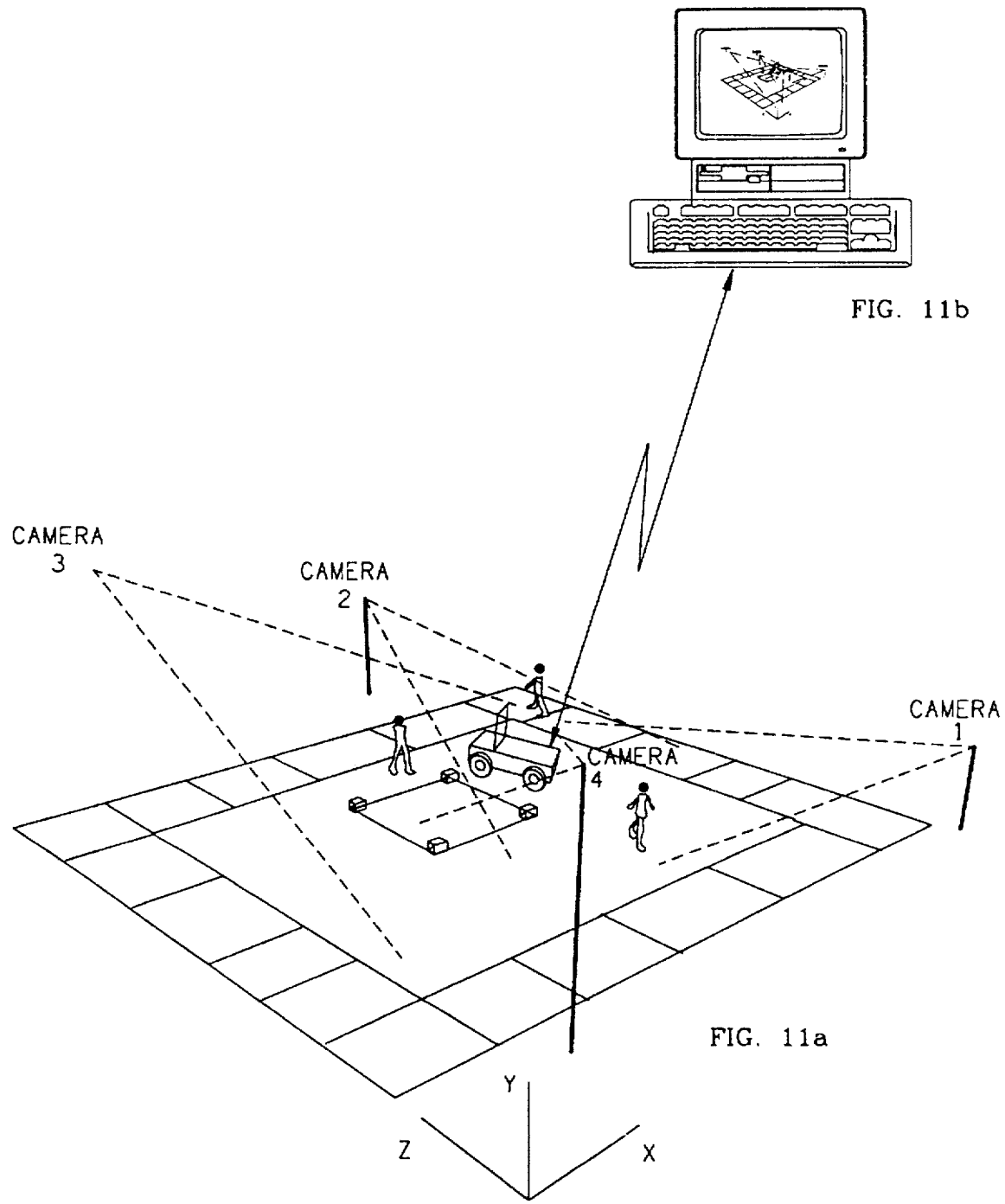
FIGS. 11a and 11b constitute a schematic diagram showing a Global Multi-Perspective Perception System (GM-PPS) portion of the Multiple Perspective Interactive (MPI) video system in accordance with the present invention in use to take data from calibrated cameras covering a scene from different perspectives in order to dynamically detect, localize, track and model moving objects—including a robot vehicle and human pedestrians—in the scene.

7.1 Organization of the Teaching of Global Multi-Perspective Perception In the MPI Video System Global Multi-Perspective Perception is taught and exercised in a campus environment containing a (i) mobile robot, (ii) stationary obstacles, and (iii) people and vehicles moving about—actors in the scene that are shown diagrammatically in FIG. 11a. In the present approach an omniscient multi-perspective perception system uses multiple stationary cameras which provide comprehensive coverage of an extended environment. The use of fixed global cameras simplifies visual progressing.

All dynamic objects in the environment, including the robot, can be easily and accurately detected by (i) integrating motion information from the different cameras covering these objects, and, importantly to the invention, (ii) constraining the environment by analyzing only such motion as is constrained to be to a small set of known surfaces.

The particular global multi-perspective perception system that monitors the campus environment containing people, vehicles and the robot uses the several color and monochrome CCD cameras also diagrammatically represented in FIG. 11. This particular perception system is not only useful in the MPI video system, but is also useful in any completely autonomous system with or without a human in the loop, such as in the monitoring of planes on airport runways.

The operation of the global multi-perspective perception system is discussed in both human-controlled and autonomous modes. In the preferred system, individual video streams are (i) processed on separate work stations on the local network and (ii) integrated on a special purpose graphics machine on the same network. The particular system, the particular experimental setup, and pertinent performance issues, are described as follows:

The next section 8 describes the preferred approach and the principle behind camera coverage, integration and camera hand-off. The prototype global multi-perspective perception system, and the results of experiments thereon, is next described in section 9. The approach of present invention is, to the best present knowledge of inventors, a revolutionary application of computer vision that is immediately practically useable in several diverse fields such as intelligent vehicles as well as the interactive video applications—such as situation monitoring and tour guides, etc.—that are the principal subject of the present specification.

The applicability of the prototype global multi-perspective perception system to just some of these applications is presented in section 10. Opportunities for further improvements and expansions are discussed in Section 11.

8. Multi-Perspective Perception

Multi-perspective perception involves each of the following.

First, the "expectations" that various objects will be observed must be generated from multiple different camera views by use of each of (i) a priori information, (ii) an environment model, and (iii) the information requirements of the present task. The statement of the immediately preceding sentence must be read carefully because the sentence contains a great deal of information, and important characterization of one aspect of the present invention. Each of (i) a priori information, (ii) an environment model, and (iii) the information requirements of the task, have variously been considered, and melded into, prior art systems for, and methods of, machine perception. Note however, that the first sentence of this paragraph is definitive. Next, note that the use of the (i) information, (ii) environment model, and (iii) information requirements is to generate—specifically from multiple different camera views—something called "expectations". These "expectations" are the probabilities that a (i) particular object will be observed (ii) at a particular place.

Second, objects from each camera must be independently detected and localized. This is not always done on the prior art, although it is not unduly complex. Simple motion detection is mostly used in the preferred embodiment of the present, prototype, global multi-perspective perception system.

Next, the separate observations are assimilated into a three dimensional model. In this step, the preferred embodiment of the present invention leaves "familiar ground" quickly, and "plunges" into a new construct for any perception system, whether global and/or multi-perspective or not.

Fourth, and finally, the model is used in performing the required tasks. Exactly what this means must be postponed until the "model" is better understood.

Figure 12:
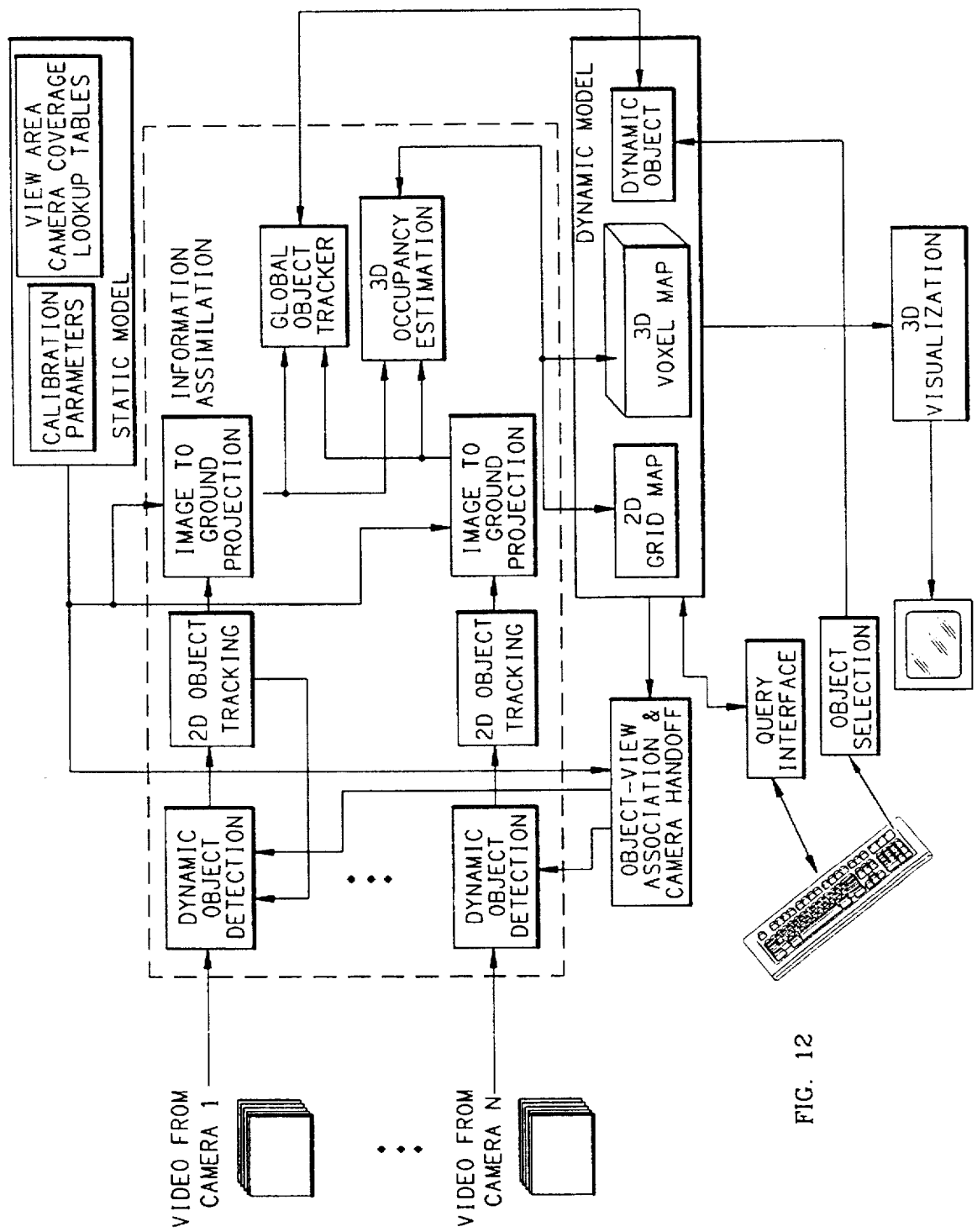
FIG. 12 is a top-level block diagram showing the high level architecture of the Global Multi-Perspective Perception System (GM-PPS) portion, previously seen in FIG. 11, of the Multiple Perspective Interactive (MPI) video system in accordance with the present invention, the architecture showing the interaction between a priori information formalized in a static model and the information computed during system processing and used to formulate a dynamic model.

A high-level schematic diagram of the different components of the preferred embodiment of the prototype multi-perspective perception system in accordance with the present invention is shown in FIG. 12. A study of the diagram will show that the system includes both two-dimensional and three-dimensional processing. Reference S. Chatterjee, R. Jain, A. Katkere, P. Kelly, D. Y. Kuramura, and S. Moezzi; Modeling and interactivity in MPI-Video, Technical Report VCL-94-103, Visual Computing Laboratory, University of California, San Diego, Dec. 1994.

Two key aspects of the architecture diagrammed in FIG. 12 are the (i) static model and the (ii) dynamic model. The static model contains a priori information such as camera calibration parameters, look-up tables and obstacle information. The dynamic model contains task specific information like two dimensional and three dimensional maps, dynamic objects, states of objects in the scene (e.g. a particular human is mobile, or the robot vehicle immobile), etc.

8.1 Three-dimensional Modeling

The three-dimensional model of the preferred embodiment of the prototype multi-perspective perception system in accordance with the present invention is created using information from multiple video streams. This model provides information that cannot be derived from a single camera view due to occlusion, size of the objects, etc. Reference S. Chatterjee, et al. op. cit.

A good three dimensional model is required to recognize complex static and moving obstacles. At a basic level, the multi-perspective perception system must maintain information about the positions of all the significant static obstacles and dynamic objects in the environment. In addition, the system must extract information from both the two-dimensional static model as well as the three-dimensional dynamic model. As such, a representation must be chosen that (i) facilitates maintenance of object positional information as well as (ii) supporting more sophisticated questions about object behavior.

While information representation can be considered an implementation issue, the particular presentation chosen will significantly affect the system development. Thus, information representation is considered to be an important element of the preferred multi-perspective perception system, and of its architecture. In the preferred system, geometric information is represented as a combination of voxel representation, gridmap representation and object-location representation. Specific implementations and domains deal with this differently.

When combined with information about the exact position and orientation of a camera, the a priori knowledge of the static environment is very rich source of information which has not previously received much attention. For each single view, the preferred system is able to compute the three dimensional position of each dynamic object detected by its motion segmentation component. To do so, the (i) a priori information about the scene and (ii) the camera calibration parameters are coupled with (iii) the assumption that all dynamic objects move on the ground surface.

Using this information it is a straightforward exercise for a practitioner of the computer programming arts to compute the equation of the line that passes through the camera projection point and a given feature on its image plane. Then, by assuming that the lowest image point of a dynamic object is on the ground, the approximate position of the object on the ground plane os readily found. Positional information obtained from all views is assimilated and stored in the 2D grid representing the viewing area.

Figure 13:
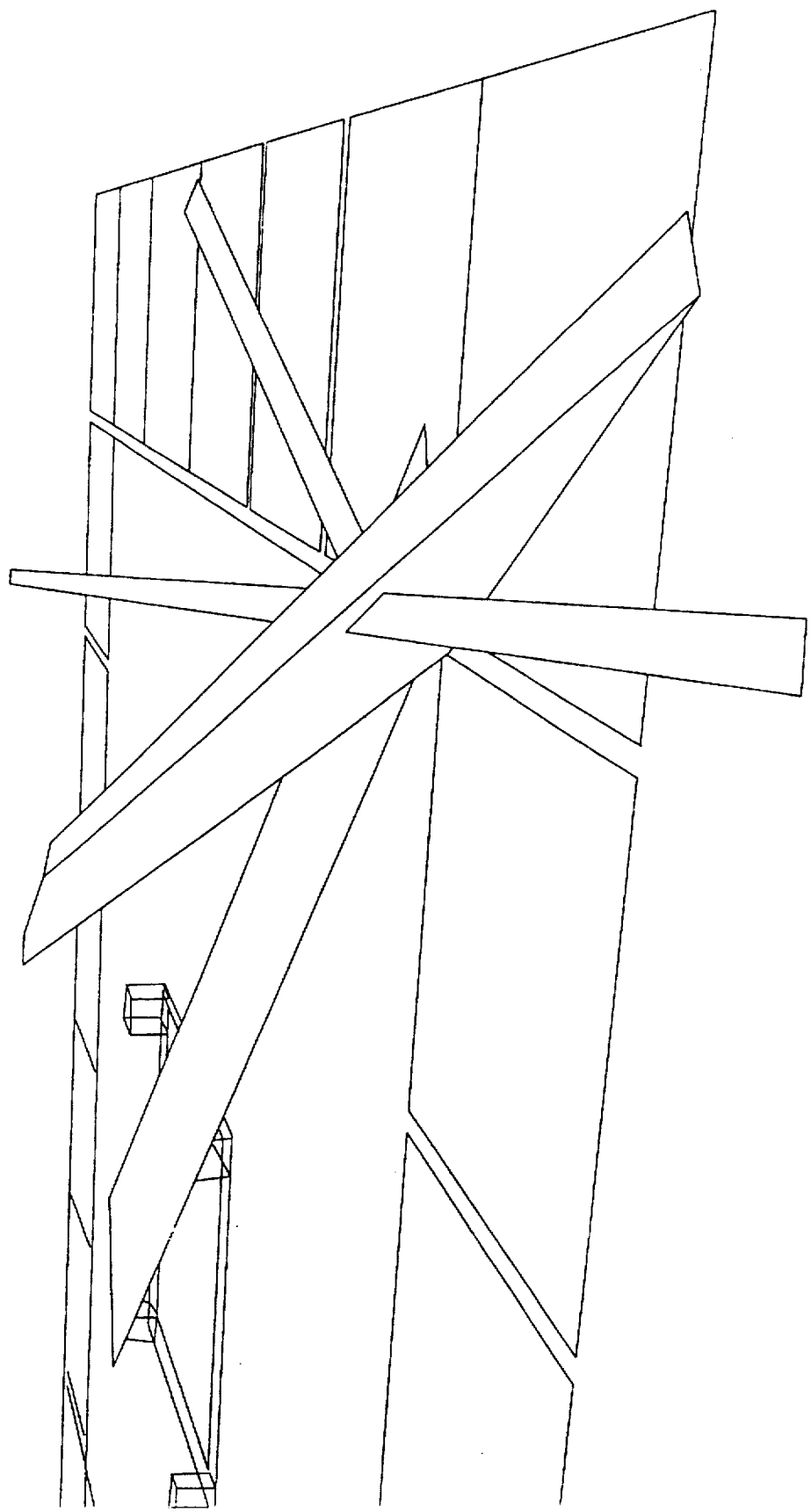
FIG. 13 is a graphical illustration showing the intersection formed by the rectangular viewing frustum of each camera scene onto the environment volume in the GM-PPS portion of the MPI video system of the present invention; the filled frustum representing possible areas where the object can be located in the 3-D model while, by use of multiple views, the intersection of the frustum from each camera will closely approximate the 3-D location and form of the object in the environment model.

For the case where an object is observed by more than one camera, the three-dimensional voxel representation is particularly efficacious. Here a dynamic object recorded on an image plane projects into some set of voxels. Multiple views of an object will produce multiple projections, one for each camera. The intersection of all such projections provides an estimate of the 3-dimensional form of the dynamic object as illustrated in FIG. 13 for an object seen by four cameras.

This section and its accompanying illustrations—short as they may be—have set forth a complete disclosure of how to make two- and three-dimensional models of the scene. It no remains only to use such models, in conjunction with other information, for useful purposes.

8.2 Automatic Camera Handoff

Camera handoff should be understood to be the event in which a dynamic object passes from one camera coverage zone to another. The multi-perspective perception system must maintain a consistent representation of an object's identity and behavior during camera handoff. This requires the maintenance of information about the object's position, its motion, etc.

Camera Handoff is a crucial aspect of processing in the multi-perspective perception system because it integrates a variety of key system components. Firstly, it relies on accurate camera calibration information, static model data. Secondly, it requires knowledge of objects and their motion through the environment determined from the dynamic model. Finally, the camera handoff can influence dynamic object detection processing.

This section 8 has described the architecture, and some important features, of the multi-perspective perception system. Reference also S. Chatterjee, et al. op. cit. The next section describes in detail the preferred implementation of the multi-perspective perception system for the application of monitoring a college courtyard.

9. Setup of the Multi-perspective Perception System, and Results of System Use

The implementation of an integrated Multiple Perspective Interactive (MPI) video system demands a robust and capable implementation of the multi-perspective perception subsystem. To simplify the teaching of the multi-perspective perception subsystem, and since this subsystem taken alone is useful in several other applications (described in Section 4) than just MPI video, the following describes the multi-perspective perception subsystem as a stand-alone system independent of the MPI video system of which it is a part. It will be understood that, one the object identifications, object tracking, and multiple perspective views of the multi-perspective perception subsystem are obtained, it is a straightforward matter to use these results in a MPI video system. (For many purposes of supplying information to the video viewer, only a high-level viewer interface is required to access the considerable current information of the multi-perspective perception subsystem.) The following sections describe the multi-perspective perception subsystem/system in detail.

9.1 Multi-Perspective Perception System Prototype 9.1.1 Setup and Use

Figure 14A:
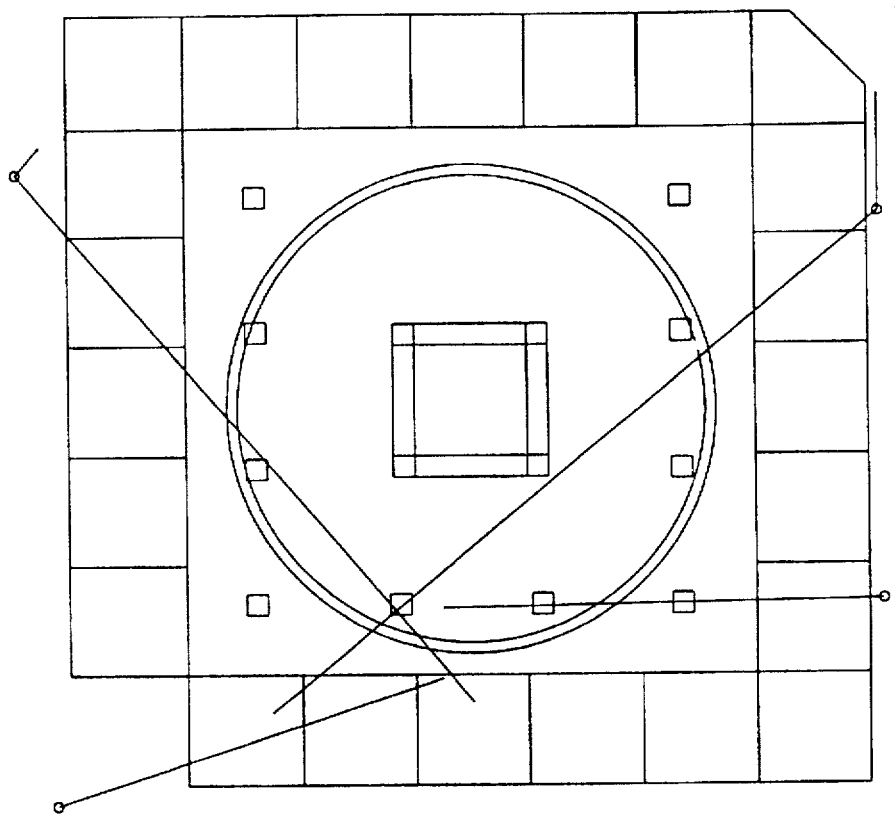
FIGS. 14a and 14b are a diagram of a particular, exemplary, environment of use of the GM-PPS portion, and of the overall MPI video system of the present invention; the environment being an actual courtyard on the campus of the University of California, San Diego, where four cameras, the locations and optical axes of which are shown, monitor an environment consisting of static object, a moving robot vehicle, and several moving persons.
Figure 14B:
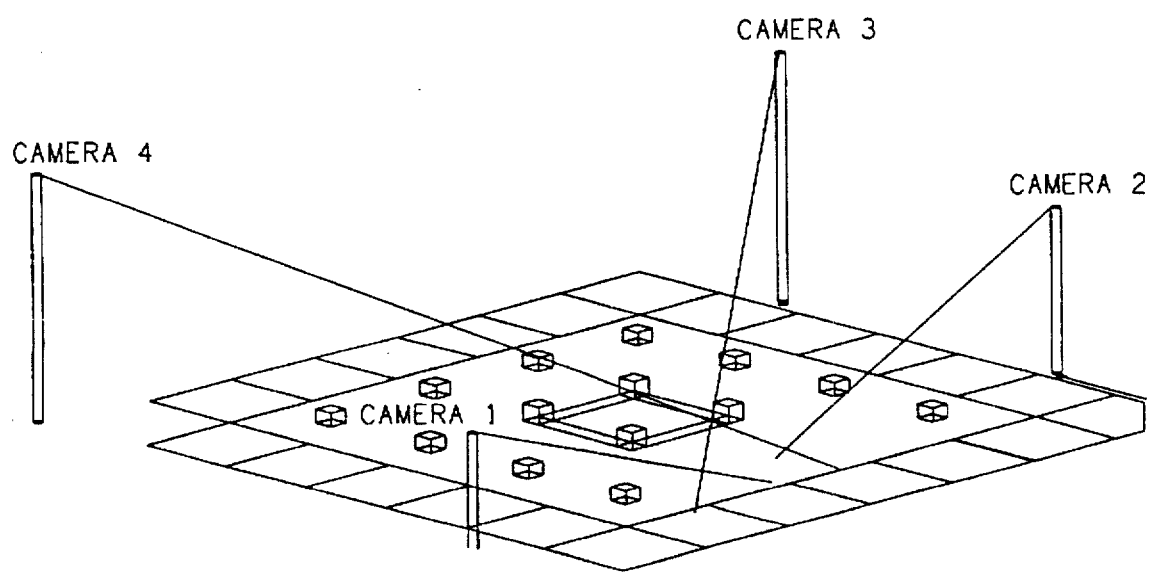

The initial development and exercise of the multi-perspective perception system took place in a laboratory on an extended digitized color sequence. A one minute long scene was digitized from four color CCD cameras overlooking a typical campus scene 1. The one minute scene covers two pedestrians, two cyclists, and a robot vehicle moving between coverage zones. A schematic of this scene shown in FIG. 14, consisting of FIG. 14a and FIG. 14b For calibration and experimental evaluation of the prototype system, one of the two pedestrians walked on a predetermined known path. No restrictions were placed on other moving objects in the scene.

9.1.2 Digitalization

The four views of the scene were digitized using a frame-addressable VCR, frame capture board combination. The synchronization was done by hand using synthetic synchronization points in the scene (known as hat drops). The resulting image sequences were placed on separate disks and controllers for independent distributed access. Having an extended pre-digitized sequence (i) accorded repeatability and (ii) permitted development of the perception system without the distractions and time consumption of repeated digitalization of the scene. The source of the scene image sequence was transparent to the perception system, and was, in fact, hidden behind a virtual frame grabber. Hence, the test was not only realistic, but migration of the perception system into (i) real-time using (ii) real video frame capture boards proved easy.

9.1.3 Camera Calibration

Calibration of the cameras in the perception system is important because accurate camera-world transformation is vital to correct system function. The cameras are assumed to be calibrated a priori, so that precise information about each camera's position and orientation could be used either directly, or by use of pre-computed camera coverage tables, to convert two dimensional observations into three dimensional model space, and, further, three dimensional expectations into 2D.

For the experimental exercise of the perception system, a complete, geometric three dimensional model of the courtyard was built using map data. This information was then used for external calibration of each camera. Calibration was done with a user in the loop. The static model was visualized from a location near the actual camera location and the user interactively modified the camera parameters until the visualized view exactly matched the actual camera view (displayed underneath).

9.1.4 Distributed Architecture

Figure 15:
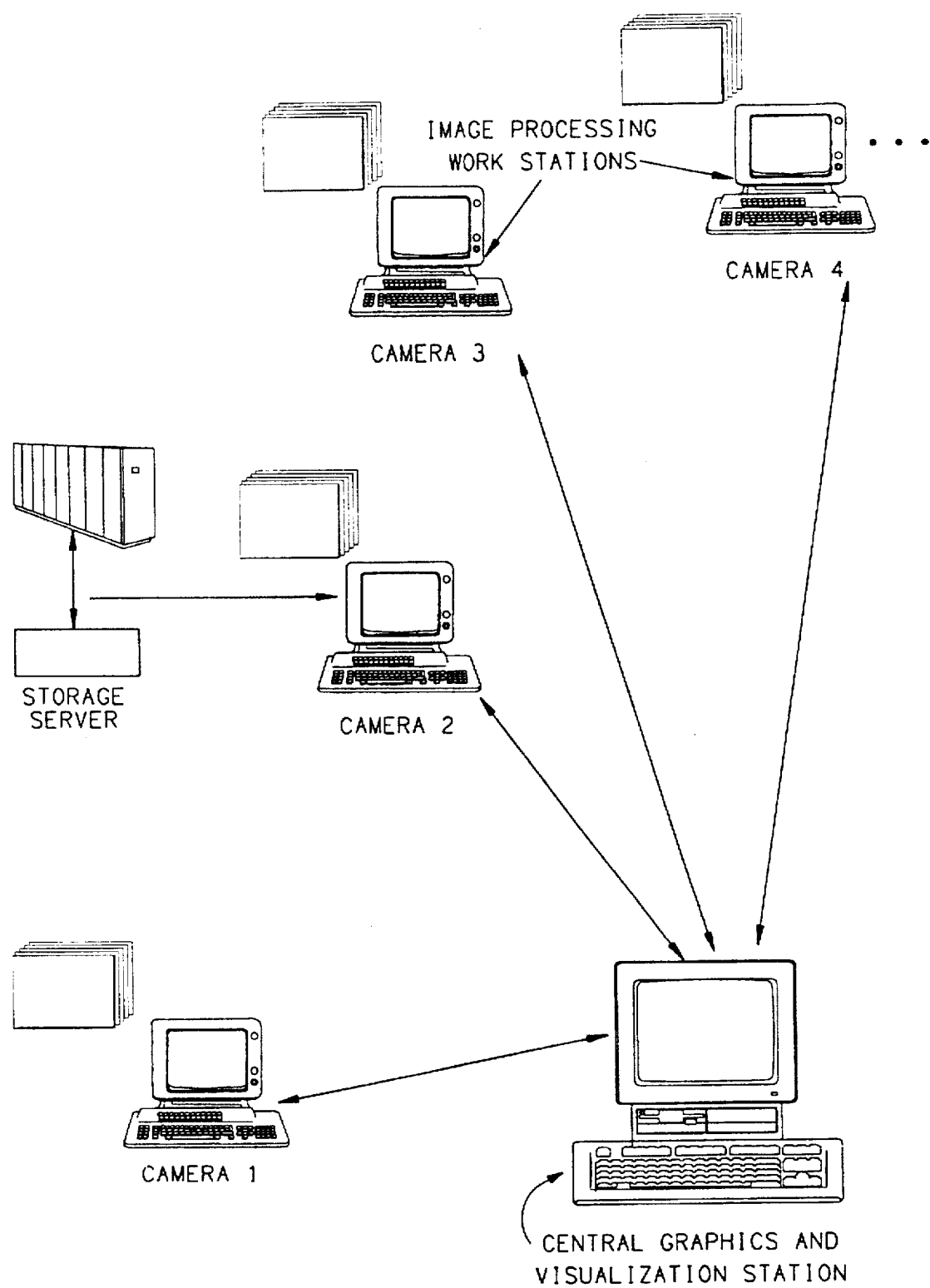
FIG. 15 is a pictorial representation of the distributed architecture of the GM-PPS portion of the MPI video system of the present invention wherein (i) a graphics and visualization workstation acts as the modeler, (ii) several workstations on the network act as slaves which process individual frames based on the master's request so as to (iii) physically store the processed frames either locally, in a nearby storage server, or, in the real-time case, as digitized information on a local or nearby frame-grabber.

At the University of California, San Diego, cameras are physically distributed throughout the campus to provide security coverage. Because the experimental use of the perception system requires synchronized frames from these cameras at a very fast rate, frame capture was done close to the camera on separate computers. For modularity and real-time video processing, it is very important that the video be independently processed close to the sources thereof. The preferred hardware setup for the experimental exercise is pictorially diagrammed in FIG. 15. Several independent heterogeneous computers—a Sun SPARCstation models 10 and 20 and/or SGI models Indigo2, Indy and Challenge—were selectively used based on criteria including (i) the load on the CPU, and the computer throughput, (ii) computer proximity to the camera and availability of a frame capture board (for real-time setup), and (iii) the proximity of each computer to a storage location, measured in Mbps (for the experimental setup).

The work stations in the experiment were connected on a 120 Mbps ethernet switch which guaranteed full-speed point-to-point connection. A central graphical work station was used to control the four video processing workstations, to maintain the environment model (and associated temporal database), and, optionally, to communicate results to another computer process such as that exercising and performing an MPI video function.

The central master computer and the remote slave computers communicate at a high symbolic level; minimal image information is exchanged. Hence only a very low network bandwidth is required for master-slave communication. The master-slave information exchange protocol is preferably as follows:

First, the master computer initializes graphics, the database and the environment model, and waits on a pre-specified port.

Second, and based on the master computer's knowledge of the network, machine throughput etc., a separate computer process starts the slave computer processes on selected remote machines.

Third, each slave computer contacts the master computer, using a pre-specified machine-port combination, and an initialization hand-shaking protocol ensues.

Fourth, the master computer acknowledges each slave computer and sends the slave computer initialization information such as (i) where the images are actually stored (for the laboratory case), (ii) the starting frame and frame interval, and (iii) camera-specific image-processing information like thresholds, masks etc.

Fifth, the slave initializes itself based on the information sent by the master computer Sixth, once the initialization is completed, the master computer, either synchronously or asynchronously depending on application, will processes the individual cameras as described in following steps seven through nine.

Seventh, whenever a frame from a specific camera needs to be processed then the master computer sends a request to that particular slave computer with information about processing the frame focus of attention windows, frame specific thresholds and other parameters, current and expected locations and identifications of moving objects etc., continuing during this processing any user interaction. In synchronous mode, requests to all slave computers are sent simultaneously and the integration is done after all slave computers have responded. In asynchronous mode, this will not necessarily proceed in unison.

Eighth, when a reply is received, the frame information is used to update the environment model and the database as described in following Section 9.1.7.

The next sections describe the communication traffic between the master and the slave computers.

9.1.5 Modeling and Visualization

A communication master computer that manages all slave computers, assimilates the processed information into an environment model, process user input (if any), and sends information to the MPI video process (if any), resides at the heart of the multi-perspective perception system. In the preferred prototype system, this master computer is an SGI Indigo2 work station with high-end graphics hardware. This machine, along with graphics software—OpenGL and Inventor—was used to develop a functional Environment Model building and visualization system. Reference J. Neidev, T. Davis, and M. Woo; *OpenGL™ Programming Guide: Official Guide to Learning OpenGL, Release 1*, Addison-Wesley Publishing Company, 1993. Reference also J. Wernecke; *The Inventor Mentor: Programming Object-Oriented 3D Graphics with Open Inventor™*; Release 2, Addison-Wesley Publishing Company, 1994.

Figure 18:
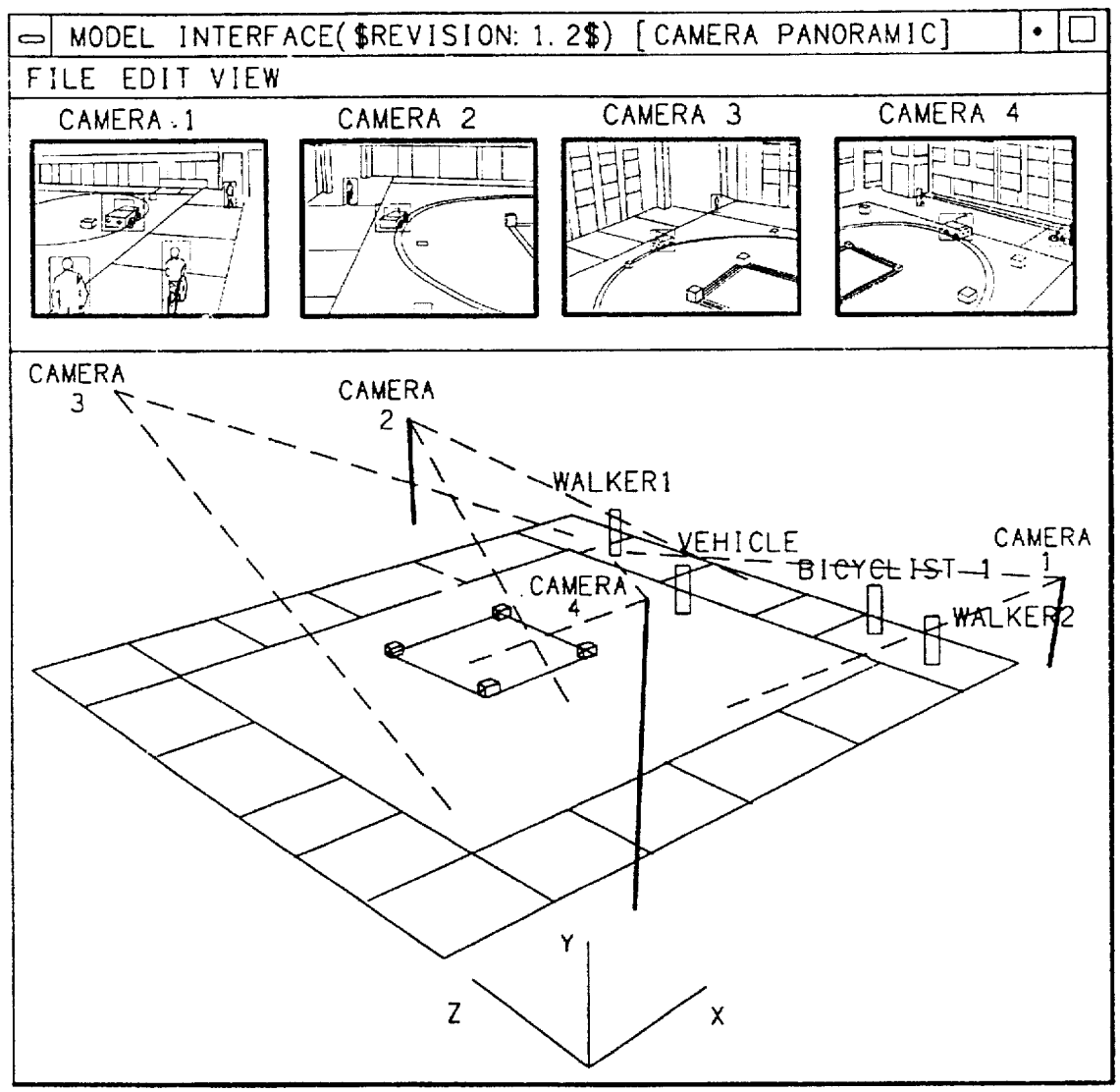
FIG. 18 is a pictorial view of a video display to the GM-PPS portion of the MPI video system of the present invention, the video display showing, as different components of the GM-PPS, views from the four cameras of FIG. 17 in a top row, and a panoramic view of the model showing hypotheses corresponding to the four moving objects in the scene in a bottom portion; the GM-PPS serving to detect each object in one or more views as is particularly shown by the bounding boxes, and serving to update object hypotheses by a line-of-sight projection of each observation.

In the preferred system, Inventor manages the scene database and OpenGL performs the actual rendering. A "snapshot" view of the visualization system of the master computer, including four camera views, and a rendered model showing all the moving objects in iconic forms, is shown in FIG. 18.

9.1.6 Video Processing

One of the goals of the exercise of the multi-perspective perception system was to illustrate the advantages of using static cameras for scene capture, and the relative simplicity of visual processing in this scenario when compared to processing from a single camera. While more sophisticated detection, recognition and tracking algorithms are still being developed and applied, the initial, prototype multi-perspective perception system uses simple yet robust motion detection and tracking.

In the prototype system, and as described in previous sections, the processing of individual video streams is done using independent video processing slaves, possibly running on several different machines. The synchronization and coordination of these slaves, any required resolution of inconsistencies, and generation of expectations is done at the master.

Independent processing of information streams is an important feature of the information assimilation architecture of the present invention, and is a continuation and outgrowth of the work of some of the inventors and their colleagues. See, for example, R. Jain; *Environment models and information assimilation*, Technical Report RJ 6866 (65692), IBM Almaden Research Center, San Jose, Calif., 1989; Y. Roth and R. Jain; *Knowledge caching for sensor-based systems*, Artificial Intelligence, 71: 257–280, Dec.

1994; and A. Katkere and R. Jain; *A framework for information assimilation*, to be published in Exploratory Vision edited by M. Landy, et al., 1994.

Figure 16:
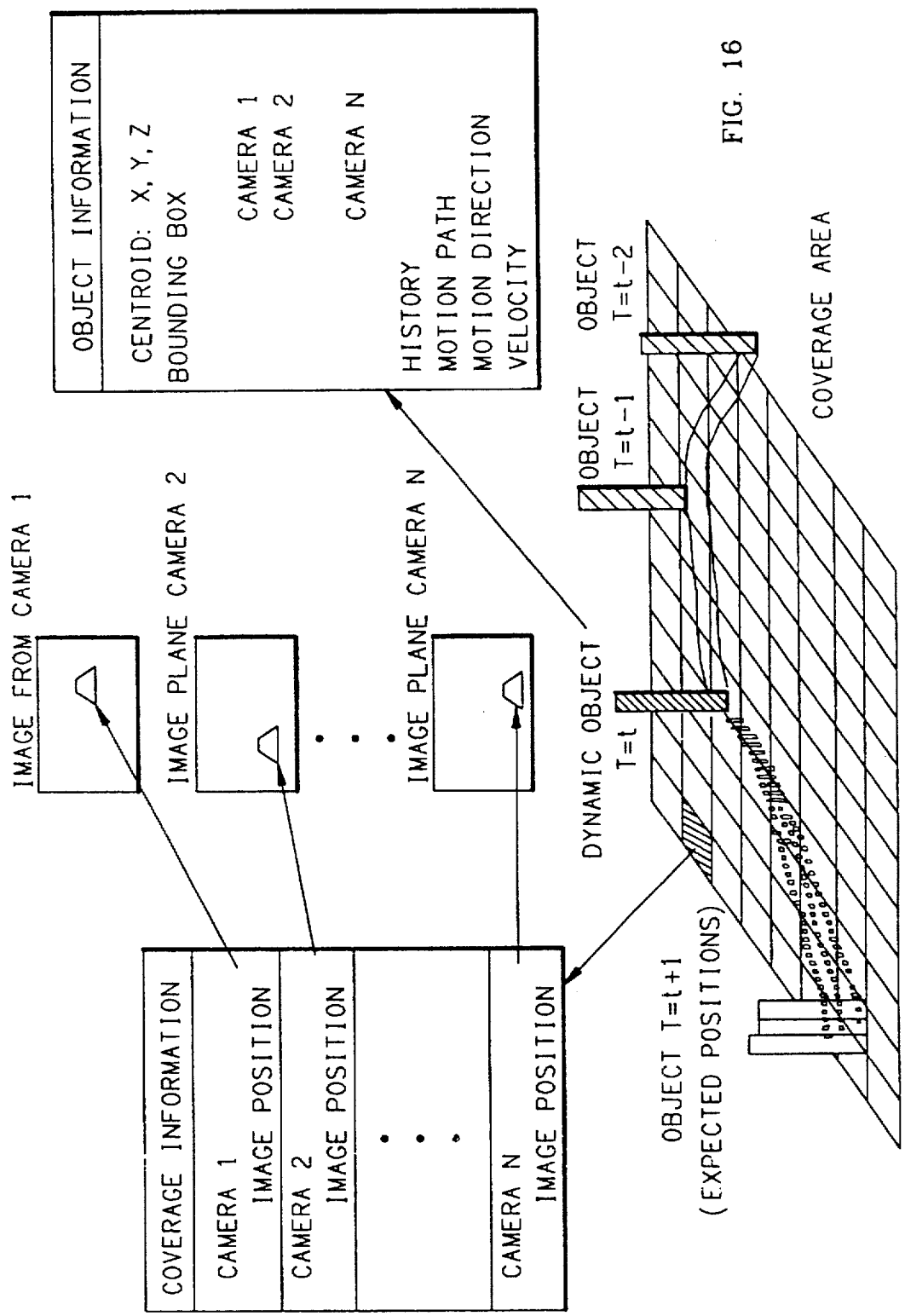
FIG. 16 is a diagram showing the derivation of a camera coverage table for an area of interest, or environment, in which objects will be detected, localized, tracked and modeled by the GM-PPS portion of the MPI video system of the present invention; each grid cell in the area is associated with its image in each camera plane while, in addition, the diagram shows an object dynamically moving through the scene and the type of information the GM-PPS portion of the MPI video system uses to maintain knowledge about this object's identity.

The independent processing results in pluggable and dynamically reconfigurable processing tracks. The preferred, prototypical, communication slave computers perform the following steps on each individual video frame. Video processing is limited by focus of attention rectangles specified by the master computer, and pre-computed static mask images delineating portions of a camera view which cannot possibly have any interesting motion. The computation of the former is done using current locations of the object hypotheses in each view and projected locations in the next view. The latter is currently created by hand, painting out areas of each view not on the navigable surface (walls, for example). Camera coverage tables help the master computer in these computations. Coverage tables, and the concept of objects, are both illustrated in FIG. 16.

In operation, the input frame is first smoothed to remove some noise. Then the difference image $d_{t,t-1}$ is computed as follows. Only pixels that are in the focus of attention windows and that are not masked are considered.

$$d_{t,t-1} = \text{Threshold}(\text{Abs}(F_{t-1} - F_t), \text{threshold\_value})$$

Optionally, to remove motion shadows, following operation is done:

$$d_t''' = d_{t,t-1} \ \& \ d_{t,t+1}$$

This shadow-removing step is not invariably used nor required since it needs a one frame look-ahead. In many cases simple heuristics may be used to eliminate motion shadows at a symbolic level.

Nest, components on binary difference image are computed based on a four-neighborhood criterion. Components that are too small or too big are thrown away because they usually constitute noise. Frames that contain a large number of components are also discarded. Both centroid (from first moments), and orientation and elongation (from the second moments), are extracted for each component.

Next, several optional filters are applied at the slave site to the list of components obtained from the previous step. Commonly used filters include (i) merging of overlapping bounding boxes, (ii) hard limits of orientation and elongation, and (iii) distance from expected features etc.

Finally, the resulting list is sent back to the master site.

9.1.7 Assimilation and Updating Object Hypotheses

The central visualization and modeling site receives processed visual information from the video processing sites and creates/updates object hypotheses. There are several sophisticated ways of so doing. Currently, and for the sake of simplicity in developing a completely operative prototype, this is done as follows:

First, he list of two-dimensional (2-D) object bounding boxes is further filtered based on global knowledge.

Second, the footprint of each bounding box is projected to the primary surface of motion by intersecting a ray drawn from the optic center of that particular camera through the foot of the bounding box with the ground surface.

Third, each valid footprint is tested for membership with existing objects and the observation is added as support to the closest object, if any. If no object is close enough, then a new object hypothesis is created.

Fourth, all supporting observations are used (with appropriate weighting based on distance from the camera, direction of motion, etc.) to update the position of each object.

Fifth, the object positions are projected into the next frame based on a domain-dependent tracker.

Sixth, if events in the scene are to be recognized, object positions and associations are compared against predetermined templates. For example, if in the courtyard scene the robot has moved into spatial coincidence with one of the predetermined immovable objects, such as a bench, then the robot may have run into the bench—an abnormal and undesired occurrence. For example, if in the scene of a football game the football has moved in a short time interval from spatial coincidence with a moving player that was predetermined to be of a first team to spatial coincidence with a moving player that is predetermined to be of a second team—especially if the football is detected to have reversed its direction of movement on the field—then any of a (i) kickoff, (ii) fumble, or (iii) interception may have transpired. If the detected event is of interest to the viewer in the MPI video system, then appropriate control signals are sent. Also, based on the sub-systems knowledge of static objects, if an actual or projected position of a dynamic object intersects a static object, then an appropriate message may be sent. If the scene of a football game the football is determined to be in spatial coincidence with the forty yard marker, then it is reported that the football is on the forty yard line.

9.1.8 Results

Each of FIGS. 17 through 21 frames in an exemplary exercise—consisting of one thousand (1000) total frames from four (4) different cameras acquired as described in Section 9.1.2—of the Multi-perspective perception subsystem.

Figure 21:
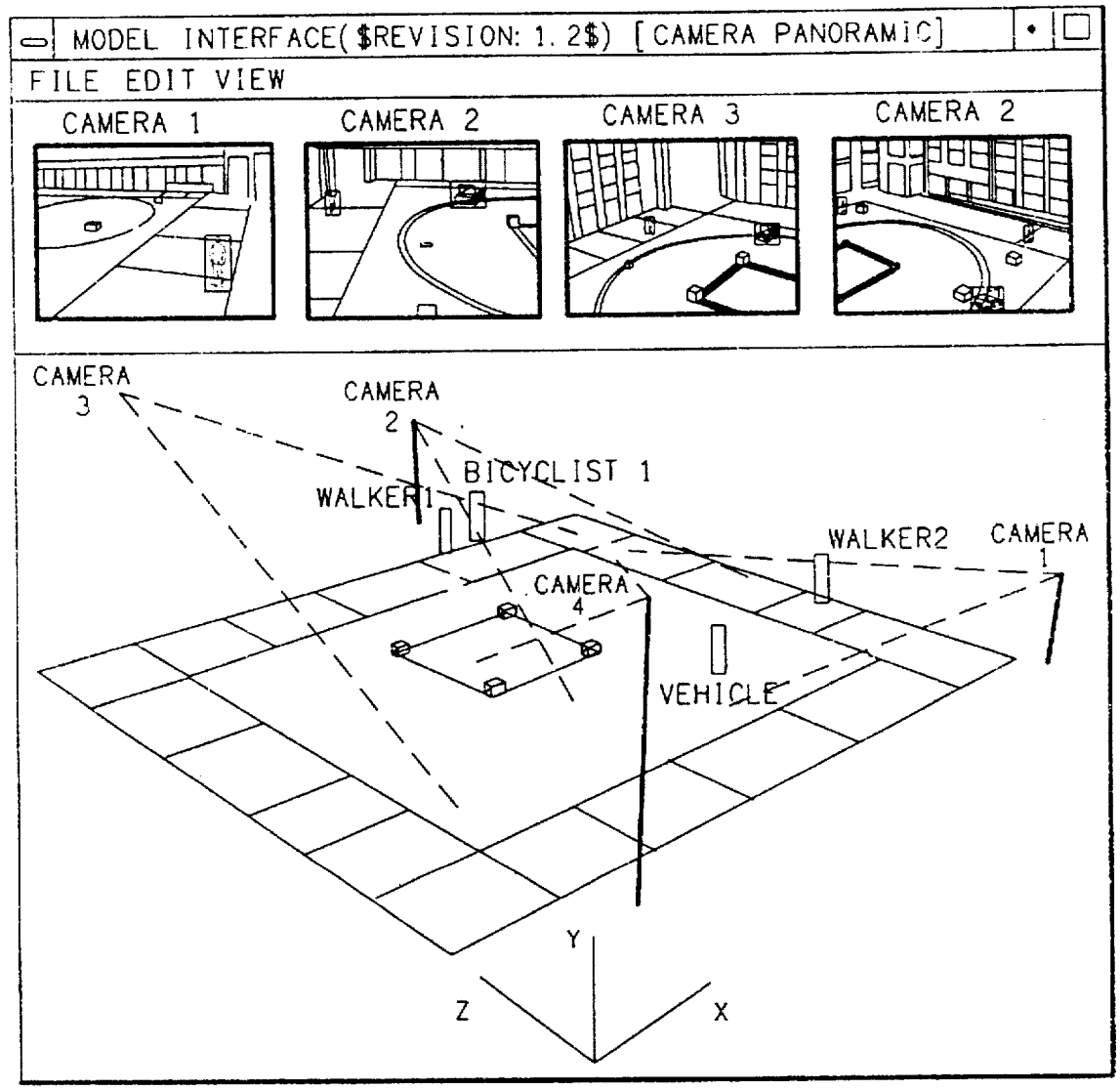
FIG. 21 is another pictorial view of the video display to the GM-PPS portion of the MPI video system of the present invention previously seen in FIG. 18, the video display now showing a panoramic view of the model showing the hypotheses corresponding to the four moving objects in the scene at the global time 00:22:39:06 as was previously shown in FIG. 20.

FIGS. 17 through 19 show the state of the subsystem at global time 00:22:29:06. FIGS. 20 and 21 show the state of the subsystem at the global time 00:22:39:06. In FIG. 17, four dynamic objects are shown in the scene: a robot vehicle, two pedestrians and a bicyclist. The scene is covered by four different cameras. A fifth object—another bicyclist—is shown, but is not labeled for clarity.

Each of the four cameras has its own clock, as is shown under the camera's view in one of FIGS. 17 through 17d. Camera number three (#3), which is arbitrarily known as "Saied's camera", is used to maintain the global clock since this camera has the largest coverage and the best image quality. FIG. 17a–17d clearly shows the coverage of each camera.

As shown in FIG. 17, an object that is out of view, too small, and/or occluded from view in one camera is in view, large and/or un-occluded to the view of another camera. Note that the object labels used in the FIG. 17 are for explanation only. The prototype subsystem does not include any non-trivial object recognition, and all object identifiers that persist over time are automatically assigned b} the system. Mnemonic names like "Walker 1", or "Walker" refer to the same object identification (e.g., what the software program would label "BasicEnvObject0023", "BasicEnvObject0047", etc.) over all the different frames of FIGS. 17–21.

A pictorial representation of the display screen showing the operator interface to the multi-perspective perception subsystem is shown in FIG. 18. Four camera views are shown in the top row of FIG. 18. Each view is labeled using its mnemonic identification instead of its numeric identification because humans respond better to mnemonic "id's". Each view may be associated with a one of FIGS. 17a–17d.

A red rectangle is drawn automatically around each detected object in each camera's view of the scene. It can be clearly seen how objects are robustly detected in the different images obtained with cameras of different characteristics (huge variations in color, color vs. monochrome)—even when the object is just a few pixels wide.

The bottom section of the operator display screen in FIG. 18 shows the object hypotheses which are formed over several frames (first frame is global clock 00:22:10:0). The intensity each object's marker represents the confidence in each hypotheses. The entire display screen, the objects depicted, and the object hypothesis diagrammatically depicted, is, as might well be expected, in full color. FIGS. 17–21 are therefore monochrome of color images. In particular, the object markers are preferably in the color yellow, and the intensity of the bight yellow color of each object's marker represents the confidence in the hypotheses for that object. The eye is sensitive to discern even such slight differences in color intensity as correspond to differences in confidence.

The multi-perspective perception subsystem has a high confidence in each object for which a marker is depicted in FIG. 18 because, at the particular global time represented, each object happens to have been observed from many cameras over several past frames.

The three-dimensional model at global time 00:22:29:06 is shown in FIGS. 19a–19e in both real and virtual views. FIGS. 19a–19d show the model from the four real camera views. One-to-one correspondence between the model and the camera views can be clearly seen. The fifth view of FIG. 19e is a virtual view of the model from directly overhead the courtyard—where no real camera actually exists. This virtual view shows the exact locations of all three objects, including the robotic vehicle, in the two-dimensional plane of the courtyard. Three objects are very accurately localized. The fourth object, Walker Number Two (#2) in FIGS. 17 and 18, has some error in localization since this person is (i) not visible in Camera number four (#4), and (ii) his/her coverage is very small in Cameras numbers two and three (#2 & #3), hence leading to some errors.

Note that even though the object Walker number two (#2) 2 is visible in Camera number one (#1), that particular observation is not used since its bounding box intersects the bottom of the image. Obviously, when an object's bounding box intersects the bottom of the image, its full extent cannot be determined and should be ignored. To show the development of object hypotheses over time, a snapshot of the experiment is taken ten (10) seconds later. FIGS. 20 and 21 show that state. FIG. 20 corresponds to FIG. 18 while FIG. 21 corresponds to FIG. 19. One important observation to make in FIGS. 20 and 21 is that, given the relative proximity of Walker number one (#1) and Bicyclist number one (#1), both are still classified as separate objects. This is only possible due to the subsystem's history and tracking mechanism.

9.2 Applications

In addition to multi-perspective interactive (MPI) video, a variety of other application areas can benefit from the global multi-perspective perception subsystem described. For instance, environments demanding sophisticated visual monitoring, such as airport runways and hazardous or complex roadway traffic situations can advantageously use the global multi-perspective perception subsystem. In these environments, as in MPI video, objects must be recognized and identified, and spatial-temporal information about objects' locations and behaviors must provided to a user.

The expected first application of the global multi-perspective perception subsystem to the MPI video system has been in sports, and it is expected that sports and other entertainment applications—which greatly benefit—will be the first commercial application of the subsystem/system. Sports events, e.g. football games, are already commonly imaged with video cameras from several different spatial perspectives—as many as several dozen such for a major professional football game. The reason that still more cameras are not used is primarily perceived as having to do to the expense of such human cameramen as are required to focus the camera image on the "action", and not the cost of the camera. Additionally, it is unsure how many different "feeds" a sports editor can use and select amongst—especially in real time. The reason the televised sporting event viewing public is by an large satisfied with the coverage offered is that they have never seen anything better—including in the movies. Few people have been privileged to edit a movie or a video, and even fewer to their own personal taste (no matter how weird, or deviant). The machine-based MPI video of the present invention will, of course, accord viewing diversity without the substantial expense of human labor.

Consider that, in using the global multi-perspective perception subsystem and the MPI video system, multiple video perspectives are integrated into a single comprehensive model of the action. Such a representation can initially assist a number of video editors in choosing between different perspectives, for example a video editor for the "defense", and one for the "offense" and one for the "offensive receivers", etc., as well as the standard "whole game" video editor. Ultimately, and with increasingly affordable computer power, even a regular viewer who is interested, for example, in a particular player would be able to customize his video display based on that player. Interactive Video applications such as these will greatly benefit from, and will use, both the global multi-perspective perception subsystem and the MPI video system.

Still another application where the global multi-perspective perception subsystem may be used directly is as a tour guide in a museum or any such confined space. Rather than moving objects in the scene (i.e. the courtyard, or the football field), the scene can remained fixed (i.e., the museum) and the camera can move. The response accorded a museum visitor/video camera user will be even more powerful than, for example, the hypertext linkage on the World Wide Web of the Internet. On an interactive computer screen and system (whether on the Internet or not) a viewer/user and point and click his/her way to additional information. However, the viewer/user is viewing on a video representation of museum art, and not the real thing.

Consider now a visit to a museum of art using, instead of a self-guided tour headset, a hand-held video camera. The user/viewer can go anywhere that he or she wants within the galleries of the museum, and can point at any art work, to perhaps show not only the scene at hand in the viewfinder of his or her video camera, but perhaps also a video and/or audio overlay that has interactively been sent to the user's video camera from "computer central". The "computer central" recognizes where in the museum the user's video—which is also transmitted out to the "computer central"—arises from. Simple "helps" in the gallery rooms, such as bar codes, may perhaps help the "computer central" to better recognize where an individual user is, and in what direction the user is pointing. So far this scheme may not seem much different, and potentially more complex and expensive, than simply having a user-initiated information playback system at each painting (although problems of time synchronization for multiple simultaneous viewers may be encountered with such a system).

The advantage that the global multi-perspective perception subsystem offers in the art museum environment is that accumulation of a "user track", instead of an "object track", becomes trivial. The user may be guided in a generally non-repetitious track through the galleries. If he/she stops and lingers for a one artist, or a one subject matter, or a style, or a period, etc., then selected further works of the artist, subject matter, style, period, etc., that seem to command the user's interest may be highlighted to the user. If the user dwells at length at a single work, or at a portion thereof, the central computer can perhaps send textual or audio information so regarding. If the user fidgets, or moves on, then the provided information is obviously of no interest to the user, and may be terminated. If the user listens and views through all offered messages that are classified "historical perspective of the persons and things depicted in the art work viewed", then it might reasonably be assumed that the user is interested in history. If, on the contrary, the user listens and views through all offered messages that are classified "life of the artist", then it might reasonably be assumed that the user is interested in biography.

9.3 Conclusions, and Future Developments, Concerning the Global Multi-perspective Perception Subsystem The complex phenomena of "man-machine information systems of the future" discussed in the immediately proceeding section may seem all "fine and good", or even fascinating, but some minutes deliberation are likely required to understand exactly what this all has to do with the present invention. In the simplest possible terms, information—and a great, great deal of such information, indeed—comes to a camera, which is the best present machine substitute for human vision, in the form of two-dimensional images. However, our own human vision is stereoscopic, and our eye/brains combination, perceptive of not two, but three, dimensions. We reason things out spatially in three dimensions, and we are interested in what goes on in three dimensions—as at a real live football game—as well as in two dimensions—as in the presentation of a football game on television. (We are also interested in smelling, tasting and/or hearing concurrently with our viewing, but the present invention cannot do anything about satisfying this desire.)

It is the teaching of the present invention, broadly speaking, that in order to best serve man, machine systems that convey visual information ought to, if at all possible or practical, "rise to the level" of three-dimensional information. The machine system would desirably so rise not in the images that it displays to viewers (which displayed images will, alas, remain two-dimensional for the foreseeable future) but, instead, in the construction and management of a database from which information can be drawn. Moreover, if this three-dimensional database is good enough, and if the machine (computer) processes that operate upon it are clever enough, then the power, and the flexibility, or viewer service, and presentations, are magnified. This magnification is in the same sense that we get more out of life by operating as autonomous agents in the three-dimensional world than we would if we could view all the cinema of the world for free forever in a darkened room. If a human cannot interact with his/her environment—even as viewed, when necessary, through a two-dimensional window—then some of the essence of living is surely lost.

It is the teaching of the present invention how to so construct from multiple two-dimensional video images a three-dimensional database, and how to so manage the three-dimensional database for the production of two-dimensional video images that not necessarily those images from which the database was constructed.

Future improvements to the global multi-perspective perception subsystem will involve building on the complete framework provided in this specification. Improvements on two dimensional motion detection and tracking, three dimensional integration and tracking, etc. are possible. Another important extension of the present invention would be to use cooperative active cameras for enhanced track robots and other moving objects over wide areas. This approach could both (i) reduce the number of cameras required to cover an area, and (ii) improve object detection and recognition by keeping objects towards center of view.

Future improvements to the global multi-perspective perception subsystem may also be taken in the area of cooperative human-machine systems. Interactivity at the central site might be improved so as to permit a human to perform higher-level cognitive tasks than simply asking "where", or "what/who?", or "when". The human might ask, for example, "why?". In the context of football, and for the event of a tackle, the machine (the computer) might be able to advance as a possible answer (which would not invariably be correct) to the question "why (the tackle)?" something like: "Defensive Linebacker #24 at the (site of) tackle has not been impeded in his motion since the start of the play.". The machine has sensed that linebacker #24—who may or may not have actually made the tackle but who was apparently nearby—was not in contact with any defensive player prior to the tackle. In a highest-level interpretation of this event as would be, and as of the present can be, rendered only by a human being, the likely interpretation of this sequence—as was recognized by the machine—is that someone has missed a tackle.

10. The Particular, Rudimentary, Embodiment of the Invention Taught Within This Specification The present specification has taught a coherent, logical, and useful scheme of implementing virtual video/television. The particular embodiment within which the invention is taught is, as would be expected and as is desirable for the sake of simplicity of teaching, rudimentary.

The rudimentary nature of the particular embodiment taught within this specification dictates, for example, that the described manipulation and synthesis is of recorded video images, and is not of television in real time. However, this factor is a function only of the power of the computer used. The efficacy and utility of the image manipulation and synthesis scheme of the present invention taught, including by rigorous mathematics, is not diminished by the computational speed at which it is accomplished.

The rudimentary nature of the particular embodiment taught within this specification further dictates, for example, that the extraction of some scene features from these video images is not only not in real time, but is in fact done manually. This will turn out to be an insignificant expedient. First, many of the features extracted will turn out to be (i) distinct and (ii) fixed; and are in fact the hash marks and yard markings of an American football field! It is clear that these fixed features could be entered into any system, even by manual means, just once "before the game". Moreover, they are easily captured by even the most rudimentary machine vision programs. Other features extracted from the video images—such as football players and/or a football in motion—are much harder to extract, especially at high speeds and most especially in real time. To extract these moving features enters the realm of machine vision. Nonetheless that this portion of the system of the present invention is challenging, many simple machine solutions—ranging from fluorescently bar-coded objects in the scene (e.g., players and football) to full-blown, state-of-the-art machine vision programs—are possible and are discussed within this specification. In fact, with non-real-time video it is even possible—and quite practical—to have a trained human, or a squad of such, track each player or other object of concern through each video scene (e.g., a football play). The "tracked" objects (the players) are only viewed later, upon an "instant replay" or from a video archive on tape or CD-ROM. Accordingly, it is respectfully suggested that the utility, and the scope, of the present invention is not degraded by certain practical limitations, as of present, on the particular image extraction function performed in the rudimentary embodiment of the invention.

Finally, in the particular, rudimentary, embodiment of the invention taught in this specification the synthesized video image is not completely of a virtual camera/image that may be located anywhere, but is instead of a machine-determined most appropriate real-world camera. This may initially seem like a significant, and substantive, curtailment of the described scope of the present invention. However, important mitigating factors should be recognized. First, the combination of multiple images, even video images, to generate a new image is called "morphing", and is, circa 1995, well known. One simple reason that the rudimentary system of the present invention does proceed to perform this "well known" step is that it is slow when performed on the engineering workstation on which the rudimentary embodiment of the present invention has been fully operationally implemented. Another simple reason that the rudimentary system of the present invention does proceed to perform this "well known" step is that, for the example of American football initially dealt with by the system and method of the present invention, it is uncertain whether this expensive, and computationally extensive, step (which turns out to be a final step) is actually needed. Namely, many cameras exist, and will exist, at a football telecast. Even if some virtual image is desired of, for example, the right halfback during the entirety of one play, it is likely that some existing camera or combinations thereof can deliver the desired image(s). Accordingly, it is again respectfully suggested that the utility, and the scope, of the present invention is not degraded by certain practical limitations, as of present, on the particular selection/morphing function performed in the rudimentary embodiment of the invention.

In return for some compromises rooted in practical considerations, the present specification completely teaches, replete with pictures, how to implement a virtual video camera, and a virtual video image, by synthesis in a computer and in a computer system from multiple real video images that are obtained by multiple real video cameras. Because this synthesis is computationally intensive, the computer is usefully powerful, and is, in the preferred embodiment, an engineering workstation.

Moreover, depending upon how extensively and how fast (i) three-dimensional analysis of the multiple scenes is to transpire, (ii) information from the multiple scenes is to be extracted, and (iii) linkage between the multiple scenes is to be established, the computer and computer system realizing the present can usefully be very powerful, and can usefully exercise certain exotic software functions in the areas of machine vision, scene and feature analysis, and interactive control.

As explained, the present invention has not been, to the present date of filing, implemented at its "full blown" level of interactive virtual television. It need not be in order that it may be understood as a coherent, logical, and useful scheme of so implementing virtual video/television.

10.1 Directions of Future Development

This specification has described the development and actual use of a prototype football video retrieval system. This system serves to demonstrate the concepts and the potential of MPI video. The feasibility of the broader concepts is completely demonstrated. Design and implementation of MPI video for longer sequences of football, and also for other applications, is still proceeding as of the filing date.

However, as is also clear from the present specification, the MPI video system is in its infancy. The potential of the MPI video techniques is obvious. The maturation route of system implementations may possibly proceed through (i) a general purpose computer producing a single video channel of selected images (for transmission), to (ii) computers integrated with video broadcast studios so as to constantly produce multiple scene views (for selected transmission), to (iii) TV/PC set-top video processors operating on received video to produce selected images. The maturation route of system deployments may possibly proceed through (i) a single channel broadcast video system (such as may be used to support conventional, human-directed, coverage of a sporting event), to (ii) multiple-channel broadcast video systems automatically continuously producing multiple views of a single event (such as a sporting event) on each of multiple channels, to (iii) video receiving systems that, receiving multiple video views and/or an entire (pre-processed) 3D scene representation, produce a video view(s) thereof in accordance with user-selected criteria. The following are only a few examples of the useful, and probable, future developments and enhancements.

10.1.1 Scene Analysis

In the prototype MPI video system, much information was inserted manually by an operator. However to make MPI video practical for commercial use, this process should be automated as much as possible. (Notice that it is not necessary that MPI video should invariably be so automated in order to be used. Certain very crucial or interesting events for which multiple video images exist—such as key plays in sporting events—may be well deserving of careful analysis after the fact.)

Also, and as may be recalled, it was found to be difficult to determine camera status for some video frames which contain very few known points to calibrate. This problem may be solved by using information obtained from other video frames, both of other cameras in the same instant and/or of the same camera in the instants before and after. Once this technology becomes practical, it will be possible to structure many other items and objects to simplify the object recognition task.

10.1.2 Data Modeling and Indexing

Information structure that is contained in a scene is usually complicated, and the amount of information in the scene is huge. Moreover, this video information is developed and received over but a short period of time. To deal with various types of queries, good data modeling is required. See Amarnath Gupta, Terry Weymouth, and Ramesh Jain; "Semantic queries with pictures: the VIMSYS model" appearing in *Proceedings of the 17th International Conference on Very Large Data Bases*, September 1991.

To enable the best quick response to the queries, indexing techniques will be required. These techniques for images and video are just being developed.

10.1.4 The Human Interface

The present specification has taught that interaction using three-dimensional cursor is a good way for a user/viewer to point or highlight objects in three-dimensional space. However, in the field of entertainment and training, where interactive video is expected to be useful, an even more friendly interface is desired. Techniques to specify camera location, describe events of interest, and other similar things need further development. In many applications, like "telepresence", one may require extensive use of virtual reality environments. In applications like digital libraries, strong emphasis on user modeling will be essential.

Nonetheless to the potential of improving, and rendering more abstract, the user/viewer interface in some applications, this interface is most assuredly not a "weak point" of the present invention of MPI video. Indeed, it is difficult to even imagine how new and improved user/viewer interface tools may be used in the context of interactive movies and similar other applications of MPI video. It seems as if the tools that the user/viewer might reasonably require are already available right now.

10.1.4 Video Databases

As access to data from more and more cameras is permitted, the storage requirements for MPI video will increase significantly. Where and how to store this video data, and how to organize it for timely retrieval, is likely to be a major issue for expansion and extension of the MPI video system. In the prototype system, the single most critical problem has been the storage of data. Future MPI video will continue to put tremendous demands on the capacity and efficiency of organization of the storage and database systems.

10.2 Recapitulation of the Invention

In one, rudimentary, embodiment of present invention, a virtual video camera, and a virtual video image, of a scene were synthesized in a computer and in a computer system from multiple real video images of the scene that were obtained by multiple real video cameras.

This synthesis of a virtual video image was computationally intensive. Depending upon how extensively and how fast (i) three-dimensional analysis of the multiple scenes is to transpire, (ii) information from the multiple scenes is to be extracted, and (iii) linkage between the multiple scenes is to be established, the computer and computer system realizing the present can usefully be very powerful, and can usefully exercise certain exotic software functions in the areas of machine vision, scene and feature analysis, and interactive control. In the prototype system network-connected engineering work stations that were relatively new as of the 1995 date of filing were used.

Notably, however, the present invention need not be (and to the present date of filing has not been) implemented at its "full blown" level of interactive virtual television in order that it may be recognized that a coherent, logical, and useful scheme of implementing virtual video/television is shown taught.

The virtual video camera, and virtual image, produced by the MPI video system need not, and commonly does not, have any real-world counterpart. The virtual video camera and virtual image may show, for example, a view of a sporting event, for example American football, from an aerial, or an on-field, perspective at which no real camera exists or can exist.

In advanced, computationally intensive, from the virtual camera/virtual image can be computer synthesized in real time, producing virtual television.

The synthesis of virtual video images/virtual television pictures may be linked to any of (i) a perspective, (ii) an object in the video/television scene, or (iii) an event in the video/television scene. The linkage may be to a static, or a dynamic, (i) perspective, (ii) object or (iii) event. For example, the virtual video/television camera could be located (i) statically at the line of scrimmage, (ii) dynamically behind the halfback wheresoever he might go, or (iii) dynamically on the football wheresoever it might go, in a video/television presentation of a game of American football.

The virtual camera, and virtual image, that is synthesized from multiple real world video images may be so synthesized interactively, and on demand. For example, and in early deployments of the system of the invention, a television sports director might select a virtual video replay of a play in a football game keyed on a perspective, player or event, or might even so key a selected perspective of an upcoming play to be synthesized in real time, and shown as virtual television.

Ultimately, many separate viewers are able to select, as sports fans, their desired virtual images. For example, a virtual video replay, or even a virtual television, image of each of the eleven players on each of two American football teams, plus the image of the football, is carried on twenty-three television channels. The "fan" can thus follow his favorite player.

Ultimate interactive control where each "fan" can be his own sports director is possible, but demands that considerable image data (actually, three-dimensional image data) be delivered to the "fan" either non-real time in batch (e.g., on CD-ROM), or in real time (e.g., by fiber optics), and, also, that the "fan" should have a powerful computer (e.g., an engineering workstation, circa 1995).

In accordance with the preceding explanation, variations and adaptations of Multiple Perspective Interactive (MPI) video in accordance with the present invention will suggest themselves to a practitioner of the digital imaging arts. For example, monitors of the positions of the eyes might "feed back" into the view presented by the MPI video system in a manner more akin to "flying" in a virtual reality landscape than watching a football game—even as a live spectator. It may be possible for a viewer to "swoop" onto the playing field, to "circle" the stadium, and even, having crossed over to the "other side" of the stadium, to pause for a look at that side's cheerleaders.

In accordance with these and other possible variations and adaptations of the present invention, the scope of the invention should be determined in accordance with the following claims, only, and not solely in accordance with that embodiment within which the invention has been taught.

What is claimed is:

1. A method of presenting a particular two-dimensional video image of a real-world three dimensional scene to a viewer comprising:

imaging in multiple video cameras each at a different spatial location multiple two-dimensional images of a real-world scene each at a different spatial perspective;

combining in a computer the multiple two-dimensional images of the scene into a three-dimensional model of the scene;

receiving in a the computer from a prospective viewer of the scene a viewer-specified criterion relative to which criterion the viewer wishes to view the scene;

synthesizing in the computer from the three-dimensional model a particular two-dimensional image of the scene in accordance with the received viewer criterion; and displaying in a video display the particular synthesized two-dimensional image of the real-world scene to the viewer.

2. The method according to claim 1 wherein the receiving is of the viewer-specified criterion of a particular spatial perspective, relative to which particular spatial perspective the viewer wishes to view the scene; and wherein the synthesizing in the computer from the three-dimensional model is of a particular two-dimensional image of the scene in accordance with the particular spatial perspective criterion received from the viewer; and wherein the displaying in the video display is of the particular synthesized two-dimensional image of the scene that is in accordance with the particular spatial perspective received from the viewer.

3. The method according to claim 2 wherein the synthesizing is of a virtual image that is without correspondence to any of the images of the scene that are imaged by any of the multiple video cameras, this synthesized virtual image being in accordance with the particular spatial perspective criterion received from the viewer.

4. The method according to claim 1 wherein the combining is so as generate a three-dimensional model of the scene in which model objects in the scene are identified;

wherein the receiving is of the viewer-specified criterion of a selected object that the viewer wishes to particularly view within the scene; and wherein the synthesizing in the computer from the three-dimensional model is of a particular two-dimensional image of the selected object in the scene; and wherein the displaying in the video display is of the particular synthesized two-dimensional image of the scene showing the viewer-selected object.

5. The method according to claim 4 wherein the viewer-selected object in the scene is static, and unmoving, in the scene.

6. The method according to claim 4 wherein the viewer-selected object in the scene is dynamic, and moving, in the scene.

7. The method according to claim 4 wherein the viewer selects the object that he or she wishes to particularly view in the scene by act of positioning a cursor on the video display, which cursor unambiguously specifies an object in the scene by an association between the object position and the cursor position in three dimensions and is thus a three-dimensional cursor.

8. The method according to claim 1 wherein the combining is so as generate a three-dimensional model of the scene in which model events in the scene are identified;

wherein the receiving is of the viewer-specified criterion of a selected event that the viewer wishes to particularly view within the scene; and wherein the synthesizing in the computer from the three-dimensional model is of a particular two-dimensional image of the selected event in the scene; and wherein the displaying in the video display is of the particular synthesized two-dimensional image of the scene showing the viewer-selected event.

9. The method according to claim 8 wherein the viewer selects the event that he or she wishes to particularly view in the scene by act of positioning a cursor on the video display, which cursor unambiguously specifies an event in the scene by an association between the event position and the cursor position in three dimensions and is thus a three-dimensional cursor.

10. The method according to claim 1 performed in real time as virtual television presented to a viewer interactively in accordance with the viewer-specified criterion.

11. A method of presenting a particular two-dimensional video image of a real-world three dimensional scene to a viewer comprising:

imaging in multiple video cameras each at a different spatial location multiple two-dimensional images of a real-world scene each at a different spatial perspective;

combining in a computer the multiple two-dimensional images of the scene into a three-dimensional model of the scene: receiving in a the computer from a prospective viewer of the scene a viewer-specified criterion relative to which criterion the viewer wishes to view the scene;

synthesizing in the computer from the three-dimensional model a particular two-dimensional image of the scene that is without exact correspondence to any of the images of the real-world scene that are imaged by any of the multiple video cameras in accordance with the received viewer criterion; and displaying in a video display the particular synthesized two-dimensional image of the real-world scene to the viewer.

12. A method of synthesizing a virtual video image from real video images obtained by a multiple real video cameras, the method comprising:

storing in a video image database the real two-dimensional video images of a scene from each of a multiplicity of real video cameras;

creating in a computer from the multiplicity of stored two-dimensional video images a three-dimensional video database containing a three-dimensional video image of the scene; and generating a two-dimensional virtual video image of the scene from the three-dimensional video database.

13. The method according to claim 12 that, between the creating and the generating, further comprises:

selecting a spatial perspective, which spatial perspective is not that of any of the multiplicity of real video cameras, on the scene as is imaged within the three-dimensional video database;

wherein the generating of the two-dimensional virtual video image is so as to show the scene from the selected spatial perspective.

14. The method according to claim 13 wherein the selected spatial perspective is static, and fixed, during the video of the scene.

15. The method according to claim 13 wherein the selected spatial perspective is dynamic, and variable, during the video of the scene.

16. The method according to claim 13 wherein the selected spatial perspective is so dynamic and variable dependent upon occurrences in the scene.

17. The method according to claim 12 that, between the creating and the generating, further comprises:

locating a selected object in the scene as is imaged within the three-dimensional video database;

wherein the generating of the two-dimensional virtual video image is so as to best show the selected object.

18. The method according to claim 12 that, between the creating and the generating, further comprises:

dynamically tracking the scene as is imaged within the three-dimensional video database in order to recognize any occurrence of a predetermined event in the scene;

wherein the generating of the two-dimensional virtual video image is so as to best show the predetermined event.

19. The method according to claim 12 wherein the generating is of a selected two-dimensional virtual video image, on demand.

20. The method according to claim 12 wherein the generating of the selected two-dimensional virtual video image is in real time on demand, thus interactive virtual television.

21. A method of synthesizing a virtual video image from real video images obtained by a multiple real video cameras, the method comprising:

storing in a video image database the real two-dimensional video images of a scene from each of a multiplicity of real video cameras;

creating in a computer from the multiplicity of stored two-dimensional video images a three-dimensional video database containing a three-dimensional video image of the scene; and generating a two-dimensional virtual video image of the scene from the three-dimensional video database by selecting from the three-dimensional video database a two-dimensional virtual video image of the scene that corresponds to a real two-dimensional video image of a scene.

22. A system for presenting video images of a real-world scene in accordance with a predetermined criterion, the system comprising:

multiple video imagers each at a different spatial location for producing multiple two-dimensional video images of a real-world scene each at a different spatial perspective;

a viewer interface at which a prospective viewer of the scene may specify a criterion relative to which criterion the viewer wishes to view the scene;

a computer, receiving the multiple two-dimensional video images of the scene from the multiple video imagers and the viewer-specified criterion from the viewer interface, for producing from the multiple two-dimensional video images of the scene a three-dimensional model of the scene; and for synthesizing from the three-dimensional model a particular two-dimensional virtual video image of the scene in accordance with the viewer-specified criterion; and a video display, receiving the particular two-dimensional video image of the scene from the computer, for displaying the particular two-dimensional video image of the real-world scene to the viewer.

23. The system according to claim 22 wherein the viewer interface has and presents a three-dimensional cursor manipulatable by a prospective viewer of the scene so as to unambiguously specify any object in the scene even when the specified object is partially obscured by other objects in the scene.

24. A system for presenting video images of a real-world scene in accordance with a predetermined criterion, the system comprising:

multiple video cameras, each having an orientation and a lens parameter and a location that is separate from all other video cameras, for producing multiple raw two-dimensional video images of a real-world scene each at a different spatial perspective;

a camera scene builder computer, receiving the multiple raw video images from the multiple video cameras, for producing in consideration of the orientation, the lens parameter, and the location of each of the multiple video cameras, multiple two-dimensional video images of a real-world scene that are of a known spatial relationship, as well as at a different spatial perspective, one to the next;

wherein the spatial positions of all the all the multiple two-dimensional video images of a real-world scene are known;

a viewer interface at which a prospective viewer of the scene may specify a criterion relative to which criterion the viewer wishes to view the scene;

a computer, receiving the multiple two-dimensional video images of the scene from the multiple video imagers and the viewer-specified criterion from the viewer interface, for producing from the multiple two-dimensional video images of the scene a three-dimensional model of the scene; and for producing from the three-dimensional model a particular two-dimensional video image of the scene in accordance with the viewer-specified criterion; and a video display, receiving the particular two-dimensional video image of the scene from the computer, for displaying the particular two-dimensional video image of the real-world scene to the viewer.

25. A method of building a three-dimensional video model of a three-dimensional real-world scene, and of extracting video information regarding the real world scene from the model built, the method comprising:

imaging in multiple video cameras multiple frames of two-dimensional video of the three-dimensional real world scene, the two-dimensional frames from each camera arising from a unique spatial perspective on the scene;

first-analyzing the scene in two dimensions by extracting feature points from the two-dimensional video frames in order to annotate the two-dimensional video frames by certain image information contained therein, thus producing multiple annotated two-dimensional video frames;

second-analyzing in a computer the scene in three dimensions by transforming the multiple annotated two-dimensional video frames into a three-dimensional video model in which model is contained three-dimensional video of the scene, while extracting and correlating information from the annotated two-dimensional video frames so as to annotate the three-dimensional video model of the scene with such information, thus producing a three-dimensional video model annotated with scene image information, thus producing an annotated three dimensional video model;

generating in a computer from the annotated three-dimensional video model (i) a two-dimensional virtual video image (ii) synthesized in accordance with some criterion interpretable and interpreted by reference to the scene image information, thus producing a synthesized virtual two-dimensional video image; and displaying in a display the selected two-dimensional video image;

wherein frames from multiple video cameras were first-analyzed in order to produce the annotated two-dimensional video frames;

wherein the annotated two-dimensional video frames were themselves second-analyzed to produce the annotated three-dimensional video model;

wherein the interpreting, in the generating step, of the criterion by reference to the three-dimensional scene image information is thus, ultimately, an interpretation by reference to scene image information that arose from multiple video cameras;

wherein the image displayed is selected by reference to scene image information that is arose from more than just one video camera, and, indeed, is selected by reference to scene image information that arose from multiple video cameras.

26. A method of building a three-dimensional video model of a three-dimensional real-world scene, and of extracting video information regarding the real world scene from the model built, the method comprising:

imaging a three-dimensional real world scene having coordinates (x,y,z) by multiple cameras each having reference frame coordinates (p,q,s) that are different than are the camera reference frame coordinates of any other camera so as to produce multiple frames of two-dimensional video each having coordinates (p,q);

first-analyzing the scene in two dimensions by extracting feature points from the two-dimensional video frames in order to annotate the two-dimensional video frames by certain image information contained therein, thus producing multiple annotated two-dimensional video frames, the first-analyzing serving to extract feature points of coordinates ($p_0, q_0$) from the two-dimensional video frames;

second-analyzing in a computer the scene in three dimensions by transforming the multiple annotated two-dimensional video frames into a three-dimensional video model in which model is contained three-dimensional video of the scene, particularly by transforming a point (x,y,z) in the world coordinate system to a point (p,q,s) in the camera coordinate system by $$\begin{bmatrix} p \\ q \\ s \end{bmatrix} = R \begin{bmatrix} x - y_0 \\ y - y_0 \\ z - z_0 \end{bmatrix}$$

where R is a transformation matrix from the world coordinate system to the camera coordinate system, and ($x_0, y_0, z_0$) is the position of the camera, and by projecting a point (p,q,s) in the camera coordinate system to a point (u,v) on the image plane according by $$\begin{bmatrix} u \\ v \end{bmatrix} = f/s \begin{bmatrix} p \\ q \end{bmatrix}$$

where f is camera parameter that determines the degree of zoom in or zoom out;

wherein an image coordinate (u,v) that corresponds to world coordinate (x,y,z) is determined depending on the (i) camera position, (ii) camera angle and (ii) camera parameter, while extracting and correlating information from the annotated two-dimensional video frames so as to annotate the three-dimensional video model of the scene with such information, thus producing a three-dimensional video model annotated with scene image information, thus producing an annotated three dimensional video model;

generating in a computer from the annotated three-dimensional video model (i) a two-dimensional video image (ii) selected in accordance with some criterion interpretable and interpreted by reference to the scene image information, thus producing a selected two-dimensional video image; and displaying in a display the selected two-dimensional video image;

wherein frames from multiple video cameras were first-analyzed in order to produce the annotated two-dimensional video frames;

wherein the annotated two-dimensional video frames were themselves second-analyzed to produce the annotated three-dimensional video model;

wherein the interpreting, in the generating step, of the criterion by reference to the three-dimensional scene image information is thus, ultimately, an interpretation by reference to scene image information that arose from multiple video cameras;

wherein the image displayed is selected by reference to scene image information that is arose from more than just one video camera, and, indeed, is selected by reference to scene image information that arose from multiple video cameras.

27. The method according to claim 26 that, a first step, further comprises:

calibrating each of the multiple cameras by
observing a known point,
knowing thereby the observed point a pair of image coordinates and corresponding world coordinates,
applying this known pair to the equations of claim 28 so as to obtain two equations regarding the seven parameters that determine camera status,
repeating the observing, the knowing and the applying for at least four known points so as to, the minimum equations to solve the seven unknown parameters thus being provided, solve the equations and calibrate the camera coordinate system (p,q,s) to the world coordinate system (x,y,z).

28. The method according to claim 27 wherein the transforming a point (x,y,z) in the world coordinate system to a point (p,q,s) in the camera coordinate system, and the projecting of the point (p,q,s) in the camera coordinate system to a point (u,v) on the image plane, assumes, a simplifying assumption, that all points (u,v) are constrained to lie in a plane.

* * * * *